(12) United States Patent
Morikubo et al.

(10) Patent No.: US 10,432,563 B2
(45) Date of Patent: Oct. 1, 2019

(54) MAIL SERVER AND MAIL DELIVERY METHOD

(71) Applicant: Fujitsu Client Computing Limited, Kanagawa (JP)

(72) Inventors: Yuri Morikubo, Yokohama (JP); Masakazu Watari, Inashiki (JP)

(73) Assignee: Fujitsu Client Computing Limited, Kanagawa (JP)

( * ) Notice: Subject to any disclaimer, the term of this patent is extended or adjusted under 35 U.S.C. 154(b) by 262 days.

(21) Appl. No.: 15/445,940

(22) Filed: Feb. 28, 2017

(65) Prior Publication Data
US 2017/0279753 A1    Sep. 28, 2017

(30) Foreign Application Priority Data

Mar. 28, 2016    (JP) .................... 2016-063736

(51) Int. Cl.
*G06F 15/16*    (2006.01)
*H04L 12/58*    (2006.01)

(52) U.S. Cl.
CPC .............. *H04L 51/14* (2013.01); *H04L 51/24* (2013.01)

(58) Field of Classification Search
USPC ......................................................... 709/206
See application file for complete search history.

(56) References Cited

U.S. PATENT DOCUMENTS

| | | | | |
|---|---|---|---|---|
| 5,781,901 A * | 7/1998 | Kuzma | ................ | G06Q 10/107 |
| 5,923,845 A * | 7/1999 | Kamiya | ................ | G06Q 10/107 379/93.15 |
| 6,192,407 B1 * | 2/2001 | Smith | ................ | G06F 21/606 709/229 |
| 6,256,672 B1 * | 7/2001 | Redpath | ................ | H04L 29/06 709/206 |
| 6,275,848 B1 * | 8/2001 | Arnold | ................ | H04L 51/063 709/206 |
| 6,385,655 B1 * | 5/2002 | Smith | ................ | G06F 21/606 709/232 |
| 6,487,586 B2 * | 11/2002 | Ogilvie | ................ | G06Q 10/107 709/201 |
| 6,487,599 B1 * | 11/2002 | Smith | ................ | G06F 21/606 709/229 |
| 6,505,236 B1 * | 1/2003 | Pollack | ................ | G06Q 10/107 709/200 |
| 6,687,741 B1 * | 2/2004 | Ramaley | ................ | G06Q 10/107 709/206 |
| 6,839,741 B1 * | 1/2005 | Tsai | ................ | G06Q 10/10 707/999.009 |

(Continued)

FOREIGN PATENT DOCUMENTS

JP    2004-289491 A    10/2004
WO    2007/122914 A1    11/2007

*Primary Examiner* — Alicia Baturay
(74) *Attorney, Agent, or Firm* — Osha Liang LLP

(57) ABSTRACT

A non-transitory computer-readable recording medium stores therein a mail delivery program of a mail server. The mail server includes a processor. The mail delivery program to cause the processor to perform transmitting a mail with a transmission request being accepted after concealing, when the mail contains information indicating being already transmitted and information indicating concealment of a content of a description at a forwarding, the content of the description designated by the information indicating the concealment.

14 Claims, 16 Drawing Sheets

(56) References Cited

U.S. PATENT DOCUMENTS

| | | | | |
|---|---|---|---|---|
| 6,915,333 B2* | 7/2005 | Delia | ............ | G06Q 10/107 709/203 |
| 7,133,897 B1* | 11/2006 | Tran | ............ | G06Q 10/107 709/206 |
| 7,194,514 B1* | 3/2007 | Yen | ............ | H04L 51/063 709/206 |
| 7,403,983 B2* | 7/2008 | Ueno | ............ | H04L 51/063 709/206 |
| 7,409,424 B2* | 8/2008 | Parker | ............ | G06F 21/6218 709/206 |
| 7,424,513 B2* | 9/2008 | Winjum | ............ | G06Q 10/107 707/999.202 |
| 7,454,778 B2* | 11/2008 | Pearson | ............ | H04L 51/12 726/1 |
| 7,882,185 B2* | 2/2011 | Nagarajan | ............ | G06Q 30/02 709/200 |
| 7,966,375 B2* | 6/2011 | Steele | ............ | H04L 29/06 709/206 |
| 8,196,212 B2* | 6/2012 | Tsusaka | ............ | G06F 21/6245 707/781 |
| 8,364,808 B2* | 1/2013 | Shima | ............ | H04L 63/123 709/203 |
| 8,516,064 B2* | 8/2013 | Steele | ............ | H04L 29/06 709/206 |
| 8,738,715 B2* | 5/2014 | Roy | ............ | H04L 51/16 709/206 |
| 8,799,373 B2* | 8/2014 | Bian | ............ | H04L 51/066 709/206 |
| 8,843,566 B2* | 9/2014 | Thompson | ............ | H04L 51/12 709/206 |
| 9,203,650 B2* | 12/2015 | Malcolm | ............ | G06F 21/606 |
| 9,767,294 B2* | 9/2017 | Mori | ............ | G06F 21/602 |
| 10,164,920 B2* | 12/2018 | Murphy | ............ | H04L 67/42 |
| 2005/0183003 A1* | 8/2005 | Peri | ............ | G06F 17/243 715/226 |
| 2009/0319623 A1* | 12/2009 | Srinivasan | ............ | G06Q 10/107 709/206 |
| 2010/0235922 A1 | 9/2010 | Tsusaka et al. | | |
| 2010/0332484 A1* | 12/2010 | Saito | ............ | G06F 21/6245 707/757 |
| 2011/0066531 A1* | 3/2011 | Kawabata | ............ | G06Q 30/04 705/34 |
| 2014/0156773 A1* | 6/2014 | Coroy | ............ | H04L 51/24 709/206 |
| 2014/0310365 A1* | 10/2014 | Sample | ............ | H04L 51/16 709/206 |

\* cited by examiner

FIG. 4

HELLO, THERE! THIS IS THE SUBJECT OF YOUR QUERY.

ACCOUNT IS : @@st@@myid@@ed@@.
PASSWORD IS : @@st@@xyzabe@@ed@@.

PLEASE ACCEPT ABOVE MATTER.

Z1

HELLO, THERE! THIS IS THE SUBJECT OF YOUR QUERY.

ACCOUNT IS ●●●●.
PASSWORD IS ●●●●●●,

PLEASE ACCEPT ABOVE MATTER.

FIG. 10

HELLO, THERE! THIS IS THE SUBJECT OF YOUR QUERY.

ACCOUNT IS ●●●●.
PASSWORD IS ●●●●●●.

PLEASE ACCEPT ABOVE MATTER.

[HuseID: 010221018011-20150227151515]

Z15: 010221018011
Z16: 20150227151515
Z14: [HuseID: 010221018011-20150227151515]

MAIL SERVER AND MAIL DELIVERY METHOD

CROSS-REFERENCE TO RELATED APPLICATION

This application is based upon and claims the benefit of priority of the prior Japanese Patent Application No. 2016-063736, filed on Mar. 28, 2016, the entire contents of which are incorporated herein by reference.

FIELD

The embodiments discussed herein are related to a mail server and a mail delivery method.

BACKGROUND

An information processing terminal having a transmitting/receiving function of an electronic mail (which will hereinafter be simply termed a mail) has hitherto been known. The information processing terminal can be exemplified by electronic equipments including a mobile phone, a smartphone, a desktop Personal Computer (PC) or a laptop PC or a tablet PC, and a Personal Digital Assistant (PDA).

The information processing terminal is connected to a network. The network may be a wired network or a wireless networks or any combination thereof. The wired network includes, e.g., a public network instanced by the Internet and a Local Area Network (LAN). The wireless network includes, e.g., a mobile phone network and a wireless LAN. The information processing terminal runs, e.g., a mail application program (which will hereinafter be simply termed the application), a browser application (which is also called a Web browser or a mobile browser) and other equivalent applications, thereby providing a mail transmitting/receiving function via the network connecting with the information processing terminal. In the information processing terminal, the mail application and the browser application for providing the transmitting/receiving function of the electronic mail will hereinafter be referred to also as mailers.

A person using the information processing terminal (who will hereinafter be simply termed a user) transmits a created transmission mail to the network via, e.g., the mailer. The transmission mail contains a mail address for designating a destination of the transmission mail.

The transmission mail transmitted from the information processing terminal is delivered to a destination information processing terminal designated by the mail address via, e.g., a single or a plurality of mail servers connected to the network. The mall server is an information processing apparatus instanced by a desk top Personal Computer (PC) and a server.

The information processing terminal designated by the mail address accepts, e.g., a user's operation for the mailer, and receives the transmission mail delivered via the mail server. In the information processing terminal designated by the mail address, the received transmission mail is displayed on a display device instanced by a Liquid Crystal Display (LCD) via the mailer.

A recipient user receiving the transmission mail browses the transmission mail displayed on, e.g., the display device, and acquires a content of a character message and other equivalent informative forms described in a mail text of the transmission mail as notifying information. The recipient user cites/edits the transmission mail displayed on the display device, adds the message, and replies a response mail to a sender of the transmission mall via, e.g., the mailer. The response mail replied from the recipient user is delivered to the reply destination information processing terminal designated by the mail address via, e.g., the single or the plurality of mail servers connected to the networks. The recipient user cites/edits the transmission mail displayed on the display device, and forwards the mail to a third person.

Various types of information are transferred and received based on delivered mails between the information processing terminals each having the mail transmitting/receiving function via the single or the plurality of mail servers connected to the network. Note that the following Patent documents exist as documents of the related arts, in which technologies related to a technology to be described in the present specification.

DOCUMENTS OF PRIOR ARTS

Patent Documents

[Patent document 1] Japanese Laid-open Patent Publication No. 2004-289491
[Patent document 2] International Publication Pamphlet No. WO 2007/122914

SUMMARY

According to an aspect of the embodiments, a non-transitory computer-readable recording medium stores therein a mail delivery program of a mail server. The mail server includes a processor. The mail delivery program to cause the processor to perform transmitting a mail with a transmission request being accepted after concealing, when the mail contains information indicating being already transmitted and information indicating concealment of a content of a description at a forwarding, the content of the description designated by the information indicating the concealment.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 4 is a diagram illustrating a text example of a mail in which descriptive parts of confidential items are designated by using markers;

FIG. 10 is a diagram illustrating a text example after an undisplayable character process of adding reference information;

DESCRIPTION OF EMBODIMENTS

A content of the mail transmitted from the user contains information desired to be concealed from the third person other than persons concerned as the case may be. Such a type of information can be exemplified by user's individual information and privacy related information like an address, a telephone number, a birth date, and a hospital visit history. The information desired to be concealed from the third person other than the persons concerned can be exemplified by information like an ID and a password, from which a user member is specified, for accessing a Web site, a file server and other equivalent accessing destinations.

In the case of transmitting the mall containing the information desired to be concealed, the user can prevent a mistake of designating the transmission destination by using, e.g., a mis-transmission preventive function, a mail checker and other equivalent functions of the mailer. The user can prompt the recipient user of the mail to be careful about disclosing the information to the third persons other than the persons concerned by additionally writing a purport that the mail contains confidential information.

It is, however, difficult for the mail sender user to get directly involved in replying/forwarding operations of the recipient user receiving the transmission mail. Therefore, the recipient user utilizes the transmission mail by citing/editing the mail content as the case may be. The recipient user replies a response mail containing additions of mail addresses of other persons not intended by the mail sender in some cases. For example, the recipient user forwards the transmission mail transmitted by the mail sender to the third person unknown to the mail sender in some case. There is a possibility that the mail sender transmitting the mail suffers a damage due to a leakage of the information desired to be concealed as caused by replying/forwarding the mail from the reception destination. There exists the possibility of suffering the damage due to the leakage of the information desired to be concealed as caused by replying/forwarding the mail from the reception destination.

According to one aspect, one embodiment aims at concealing a content of a mail when the mail is forward to another transmission address from a transmission destination.

A mail server to run a mail delivery program according to the embodiment will hereinafter be described with reference to the drawings. A configuration of the following embodiment is an exemplification, and the mail server to run the mail delivery program is not limited to the configuration of the following embodiment. The mail server to run the mail delivery program will hereinafter be described based on the drawings of FIGS. 1 through 15. Note that the mail server to run the mall delivery program according to the embodiment will be also termed the mail server according to the embodiment.

Embodiment

[System Architecture]

Figure 1:
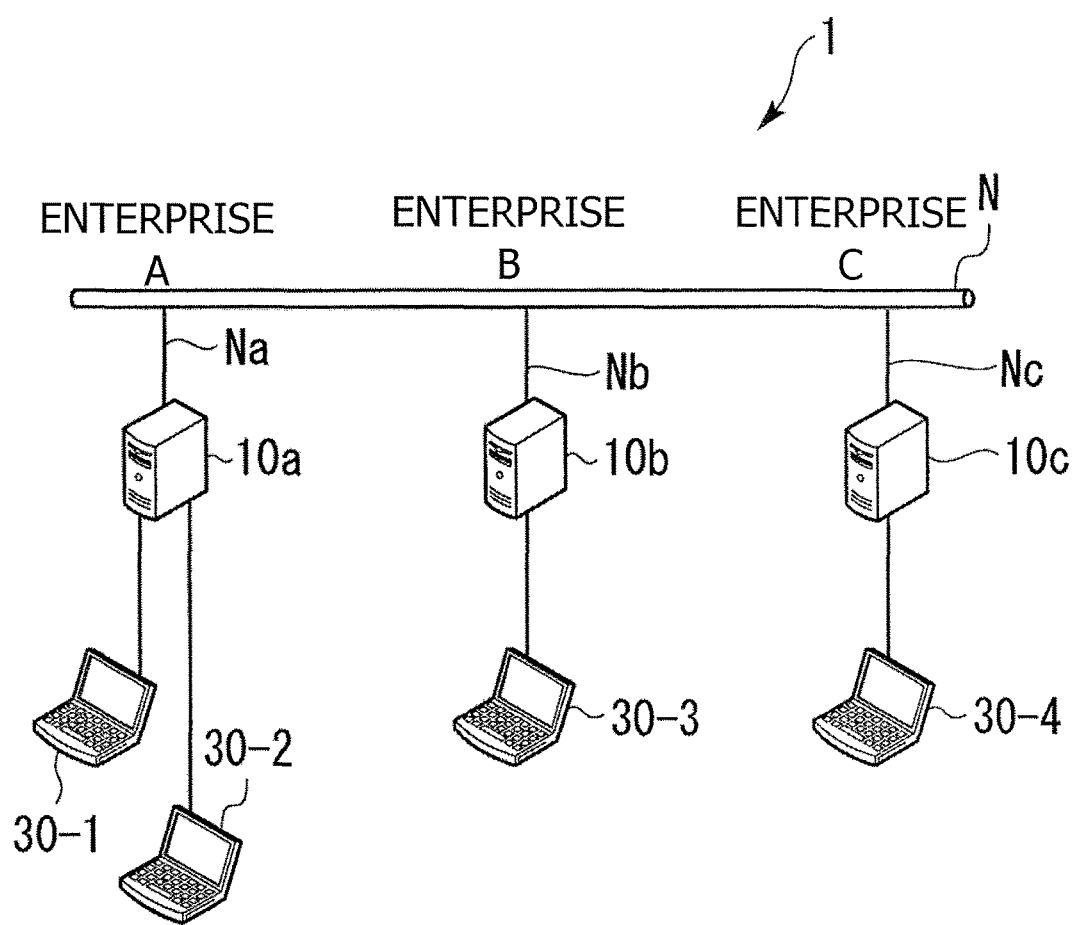
FIG. 1 is an explanatory diagram illustrating a mail delivery system.

FIG. 1 illustrates an explanatory view of a mail delivery system. A mail delivery system 1 depicted in FIG. 1 is one example of a mode of interconnecting a mail server 10a provided in an enterprise A, a mail server 10b provided in an enterprise B, and a mail server 10c provided in an enterprise C via a network N. In the mail delivery system 1, electronic mails (which will hereinafter be also simply termed e-mails) defined as electronic information are transmitted and received between computers connected to the respective mail servers via the mail servers.

The network N is a wired or wireless communication network. The network N includes, e.g., a public network instanced by the Internet, a wired network like a Local Area Network (LAN), a mobile phone network, and a wireless network like a wireless LAN. Information processing apparatuses instanced by Personal Computers (PCs) and servers can be connected by pluralities to the network N.

Mail servers 10a, 10b, 10c are information processing apparatuses instanced by the PCs and the servers. For example, an in-office network Na within the enterprise A is connected to the mail server 10a. Similarly, e.g., an in-office network Nb within the enterprise B is connected to the mail server 10b, and an in-office network Nc within the enterprise C is connected to the mail server 10c. The in-office networks Na, Nb, Nc are wired/wireless communication networks. The in-office networks Na, Nb, Nc are, e.g., wired LANs, wireless LANs and other equivalent networks. The in-office networks Na, Nb, Nc may, however, be configured to establish connections with remote places as by a Virtual Private Network (VPN) and other equivalent networks.

In FIG. 1, information processing terminals 30-1, 30-2 are connected to the in-office network Na. Likewise, an information processing terminal 30-3 is connected to the in-office network Nb, and an information processing terminal 30-4 is connected to the in-office network Nc. Note that the information processing terminals 30-1, . . . are also generically termed the information processing terminals 30. The plurality of information processing terminals 30 can be connected to each in-office network.

The information processing terminals 30 are computers each having a mail transmitting/receiving function. The information processing terminals 30 can be exemplified by electronic equipments including a mobile phone, a smartphone, a desktop PC or a laptop PC or a tablet PC, and a Personal Digital Assistant (PDA).

The mail transmitting/receiving function of the information processing terminal 30 is provided by, e.g., a mailer (a mail application, a browser application, and other equivalent applications). The applications for providing the mail transmitting/receiving function will hereinafter be also generically termed the mailers. The information processing terminal 30 generates mails, transmits/receives the mails, and saves/manages the received mails by running the installed mailer.

Note that the information processing terminal 30 may also be, e.g., a copier having a function as a copying machine, a gaming machine, a digital camera and other equivalent devices on condition that such a device is preinstalled with the mailer and connectable to each in-office network. The information processing terminal 30 may further be a wearable electronic equipment being wearable on a body of a person using the information processing terminal (who will hereinafter be simply referred to as a user).

A unique mail address is allocated to the user of the information processing terminal 30. The unique mail address allocated to the user of the information processing terminal 30 is managed by, e.g., the mail server of the in-office network to which the information processing terminal 30 is connected. In the example of FIG. 1, e.g., the mail addresses of the individual users using the information processing terminals 30-1, 30-2 are managed by the mail server 10*a* connected to the in-office network Na. Similarly, the mail address of the user using the information processing terminal 30-3 is managed by the mail server 10*b* connected to the in-office network Nb. Further, the mail address of the user using the information processing terminal 30-4 is managed by the mail server 10*c* connected to the in-office network Nc. Note that the following discussion will be made on condition that the unique mail addresses are allocated to the information processing terminals 30 used by the individual users.

In the information processing terminal 30, the mail generated via the mailer contains a header and a body. The header of the mail contains items of information, e.g., a destination mail address, a source mail address, a subject, a transmission date/time, and a message ID of the mail. The body of the mail contains a text instanced by a character message. The body of the mail can contain attached items of information, e.g., images, voices/sounds, programs and other equivalent items. Note that the destination mail address will simply be termed the "destination address", and the source mail address will be simply termed the "source address" in the following discussion.

A transmission mail generated in the information processing terminal 30 is transmitted to the mail server via the in-office network to which the information processing terminal 30 is connected. For example, the transmission mail generated by the information processing terminal 30-1 is transmitted to the mail server 10*a* via the in-office network Na. The same transmitting operations as those described above are performed in the in-office networks and the mail servers, to which the information processing terminals 30-2, 30-3, 30-4 are connected.

The information processing terminal 30 and the mail server, which are interconnected via the in-office networks, transmit and receive the mails based on predetermined communication protocols. The information processing terminal 30 running the mailer transmits the transmission mail generated by using the communication protocol instanced by Simple Mail Transfer Protocol (SMTP) to the mail server. The information processing terminal 30 running the mailer receives the mail delivered to the mail server by using communication protocols instanced by Post Office Protocol version 3 (POP3) and Internet Message Access Protocol version 4 (IMAP4).

Each mail server accepts a transmission request of the transmission mail transmitted from the information processing terminal 30 via the in-office network connecting thereto. The header of the transmission mail contains the destination address. The mail server delivers the transmission mail with its transmission request being accepted based on the destination address contained in the header of the transmission mail.

The mail address contained in the transmission mail contains, e.g., a "local-part" and a "domain name". In the following discussion, the "local-part" is referred to as a "user name". The "user name" is a name for identifying the user using the information processing terminal 30, while the "domain name" is information representing an organization to which the user belongs. By way of one example, the domain name may also be a name for identifying the mail server that manages the mail address of the user. The "user name" and the "domain name" are connected by a symbol "@" for use as the mail address. A connecting position of the information processing terminal on the network is specified by the mail address containing the "user name" and the "domain name" that are connected by the symbol "@".

Each mail server specifies, e.g., an Internet Protocol (IP) address, becoming as a destination address to which the transmission mail is delivered, of the mail server from the domain name of the destination address. The IP address is specified by querying Domain Name Sever (DNS) on the network about the domain name. Each mail server delivers the accepted transmission mail to the mail server specified by the IP address as the destination address. The transmission mail is transferred between the mail servers according to the communication protocol instanced by, e.g., the SMTP.

The mail server specified by the IP address stores the transferred transmission mail in, e.g., a mailbox and other equivalent storages (which will hereinafter be simply referred to as the mailbox) associated with the user name specified by the mail address. The mailbox is a storage area provided in the mail server. The mailbox stores, e.g., a reception mail addressed to the user name specified by the mail address. The mailbox is provided per mail address managed by the mail server. Note that the domain name specified by the transmission mail address indicates the self apparatus, in which case each mail server stores the transmission mail accepted by the mailbox associated with the user name.

In FIG. 1, it is assumed that, e.g., the information processing terminal 30-1 connected to the in-office network Na transmits the transmission mails addressed to the information processing terminal 30-2 and the information processing terminal 30-3. The mail server 10*a* connected to the in-office network Na accepts, e.g., the transmission request of the transmission mail transmitted from the information processing terminal 30-1. The mail server 10*a* executes a delivery process of delivering the transmission mail transmitted from the information processing terminal 30-1, based on the destination address contained in the header of the transmission mail. The delivery process of the transmission mail is conducted, e.g., per mail address.

The mail server 10*a* specifies the IP address of the mail server 10*b* from the domain name of the destination address, e.g., from the domain name of the mail address of the information processing terminal 30-3. The information processing terminal 30-3 is connected to the mail server 10*b* via the in-office network Nb.

The mail server 10*a* transfers the transmission mail transmitted from the information processing terminal 30-1 to the mail server 10*b* specified by the IP address via the network N. The mail server 10*b* stores the transmission mail transferred from the mail server 10*a* in the mailbox associated with the user name of the destination address. The transmission mail stored in the mailbox is received by the information processing terminal 30-3 that runs, e.g., the mailer.

Likewise, the mail server 10*a* specifies that the self apparatus is indicated by the domain name of the destination address, e.g., the domain name of the mail address of the information processing terminal 30-2. The mail server 10*a* stores the transmission mail transmitted from the information processing terminal 30-1 in the mailbox associated with the user name of the destination address. The transmission mail stored in the mailbox is received by the information processing terminal 30-1 that runs the mailer via, e.g., the in-office network Na.

The users of the information processing terminals 30-2, 30-3 create, e.g., response mails by citing and editing, on the mailer, the transmission mail received via the mail servers 10*a*, 10*b*. Each response mail is replied as addressed to the information processing terminal 30-1 that is a sender of the received transmission mail. The response mail transmitted from the information processing terminal 30-2 is replied to the information processing terminal 30-1 via the mail server 10*a*. Similarly, the response mail transmitted from the information processing terminal 30-3 is replied to the information processing terminal 30-1 via the mail servers 10*b*, 10*a*.

Herein, the response mails transmitted from the information processing terminals 30-2, 30-3 can possibly contain mail addresses of unintended third persons for the user of the information processing terminal 30-1. The transmission mail transmitted from the information processing terminal 30-1 can be possibly forwarded to the unintended third persons for the user of the information processing terminal 30-1 via the information processing terminals 30-2, 30-3. When being forwarded to the unintended third person for the user of the information processing terminal 30-1, there can be possibly a case of being damaged due to a leakage of confidential information through the users of the information processing terminals 30-2, 30-3.

Exemplification of Process of Embodiment

As described in FIG. 1, the mail transmitted from the information processing terminal 30-1 is delivered to other information processing terminals allocated with the destination addresses in the following procedure. For example, the mail server 10*a*, upon accepting the transmission request of the mail transmitted from the information processing terminal 30-1, executes the delivery process based on the destination address contained in the header of the mail. The delivery process is executed per destination address. Through the delivery processes, the mails accepted by the mail server 10*a* are received by the mail servers 10*a*, 10*b*, 10*c* specified by the domain names (IP addresses) of the destination addresses. The mails received by the mail servers are stored, e.g., in the mailboxes associated with the user names of the destination addresses. The mails stored in the mailboxes are, e.g., received by the information processing terminals 30 running the mailers and being allocated with the destination addresses.

The mail server according to the embodiment determines whether the mail delivered as addressed to the self apparatus is a mail transmitted for the first time from the sender user or a replied/forwarded mail delivered to the sender user. This determination can be made depending on whether the mail contains information indicating that the mail has been delivered to a recipient.

For example, the mail server records, in the mail, the information indicating that the mail has been delivered to the recipient when storing the mail delivered as addressed to the self apparatus in the mailbox associated with the user name of the destination address. The information indicating that the mail has been delivered to the recipient may be recorded in the mail header and may also be recorded in the mail body. However, when the mail delivered as addressed to the self apparatus already contains the information, the mail server does not record this information with respect to the mail.

Herein, the information indicating that the mail has been delivered to the recipient can be exemplified by a predetermined character string. The predetermined character string can be exemplified by a character string "X0X0X0X0" structured by combining letters and numerals, and a character string "###ZZZZZZZ###" structured by combining a self apparatus IP address "ZZZZZZZ" with symbols "#".

The mail server analyzes the mail and thus determines whether the foregoing information is contained therein. The mail server, when the mail delivered as addressed to the self apparatus contains the foregoing information, can specify that the mail is the replied/forwarded mail delivered to the sender user. Whereas when the mall delivered as addressed to the self apparatus does not contain the foregoing information, the mail server can specify that the mail is the mail transmitted for the first time from the sender user. Note that the mail delivered as addressed to the self apparatus does not contain the foregoing information, in which case the mall server records, in the mail, the information indicating that the mail has been delivered to the recipient. The mail with the information indicating that the mail has been delivered to the recipient, is stored in the mailbox associated with, e.g., the user namer of the destination address.

For example, the mail server analyzes the mail and may specify that a character string [RE:] representing a reply and forwarding of the mail is contained in a head position of the subject contained in the header. The mail server, when the character string described above exists in the subject of the mail delivered as addressed to the self apparatus, can determine that the mail is the replied/forwarded mail of the mail delivered to the user.

The mail server according to the embodiment, when the mail delivered as addressed to the self apparatus is the replied/forwarded mail of the mail delivered to the sender user, conceals a confidential item (confidential information) described in the mail. The confidential item is designated by the user who has transmitted the mail describing the information desired to be concealed. The mail server specifies the confidential item described in the mail according to the designation, and conceals the specified confidential item.

The concealment of the confidential item can be exemplified by replacing the character/character string of the confidential item described in the mail with symbols such as a solid black circle and a solid black square, and also a pictograph. It may be sufficient that the concealment enables the character/character string of the confidential item before being concealed to be converted into a undistinguishable state.

The mail server stores the mail with the confidential item being concealed in the mailbox associated with the user name of the destination address. The information processing terminal 30 allocated with the destination address receives the mail stored in the mailbox by running the mailer. The mail with the confidential item within the mail being concealed is delivered to the user of the information processing terminal 30 allocated with the destination address. As a result, the mail server according to the embodiment enables the mail content to be concealed when the mail is replied/forwarded to another destination address from the recipient.

(Case of Having No Concealment Function in Delivery Destination Mail Server)

When the mail transmitted from the information processing terminal 30 is delivered to another mail server, a delivery destination mail server, as far as being the mail server according to the embodiment, can conceal the confidential item described in the mail. The delivery destination mail server is not, however, the mail server according to the embodiment, in which case it is difficult to conceal the confidential item described in the mail. Hence, there is possibly such a case that the confidential content described in the delivered mail will be leaked via the replied/forwarded mail from the information processing terminal 30 to which the mail is delivered from the delivery destination mail server.

The mail server according to the embodiment, when delivering the mail with the transmission request being accepted, queries the mail server specified by the domain name of the destination address about whether this mail server has the concealment function. The query with respect to the mail server specified by the domain name of the destination address is made by using the communication protocol, e.g., Transmission Control Protocol/Internet Protocol (TCP/IP).

The mail server according to the embodiment, upon receiving a query about whether the mail server has the concealment function, gives a predetermined response to indicating having the concealment function to this inquirer mail server. The mail server not providing the processes that involve running the mail delivery program according to the embodiment does not have the predetermined response and does not therefore receive the response to the query. The mail server according to the embodiment can determine that the delivery destination mail server has no concealment function by detecting, e.g., a time-out and other equivalent events for the query.

The mail server according to the embodiment, when the delivery destination mail server has the concealment function, delivers the mail with the transmission request being accepted. The delivery destination mail server determines whether there is the information indicating that the mail has been delivered to the recipient recorded in the mail, and conceals the confidential item described in the mail.

Whereas when the delivery destination mall server has no concealment function, the mail server according to the embodiment executes a concealment process for the mail with the transmission request being accepted. The mail server according to the embodiment delivers the mail with the concealment process being executed to the delivery destination mail server. The mail with the confidential item being concealed is delivered to the information processing terminal 30 specified by the destination address. The mail server according to the embodiment can prevent the leakage of the information having the confidential content via the replied/forwarded mail from the destination user to whom the mail has been delivered even when the delivery destination mail server does have the concealment function.

Note that the mail server according to the embodiment, when the delivery destination mail server has no concealment function, may stop the delivery process of the mail with the transmission request being accepted after notifying the information processing terminal 30 specified by the source address of an alert (alarm). The mail server according to the embodiment can prevent the leakage of the information having the confidential item described in the mail.

By the way, when the delivery destination mail server does not have the concealment function, the recipient user, to whom the mail with the confidential item being concealed has been delivered, gets in a state of being unable to know the content of the confidential item that can be originally known to the user.

The mail server according to the embodiment adds, e.g., reference information for referring the content of the confidential item described in the mail, to the mail with the concealment process being executed. The mail server according to the embodiment includes a database (which will hereinafter be abbreviated to DB) that stores the content of the confidential item described in the mail. The content of the confidential item described in the mail is stored in the database by being associated with an identification number for uniquely identifying this content.

Herein, the reference information added to the mail with the concealment process being executed is information containing the identification number for uniquely identifying the content of the confidential item described in the mail. For example, the reference information can be exemplified by information structured by combining the IP address of the mail server including the database and the identification number. The reference information contains the IP address of the mail server including the database, thereby enabling the recipient user, to whom the mail has been delivered, to access the mail server specified by the IP address.

The recipient user of the mail, to which the reference information is added, accesses the mail server specified by the IP address through, e.g., the browser application, and can refer to the content of the confidential item described in the mail on the basis of the identification number combined with the IP address. The mail server according to the embodiment can disclose the content of the confidential item stored in the database in response to the query from the recipient user of the mail.

Note that the mail server according to the embodiment may restrict the disclosure of the content of the confidential item, e.g., a reference count of the content. For example, the mail server can restrict the reference count to "1". The mail server can restrain unnecessary disclosure of the information by restricting the reference count of the content of the confidential item.

[Configuration of Apparatus]

Figure 2:
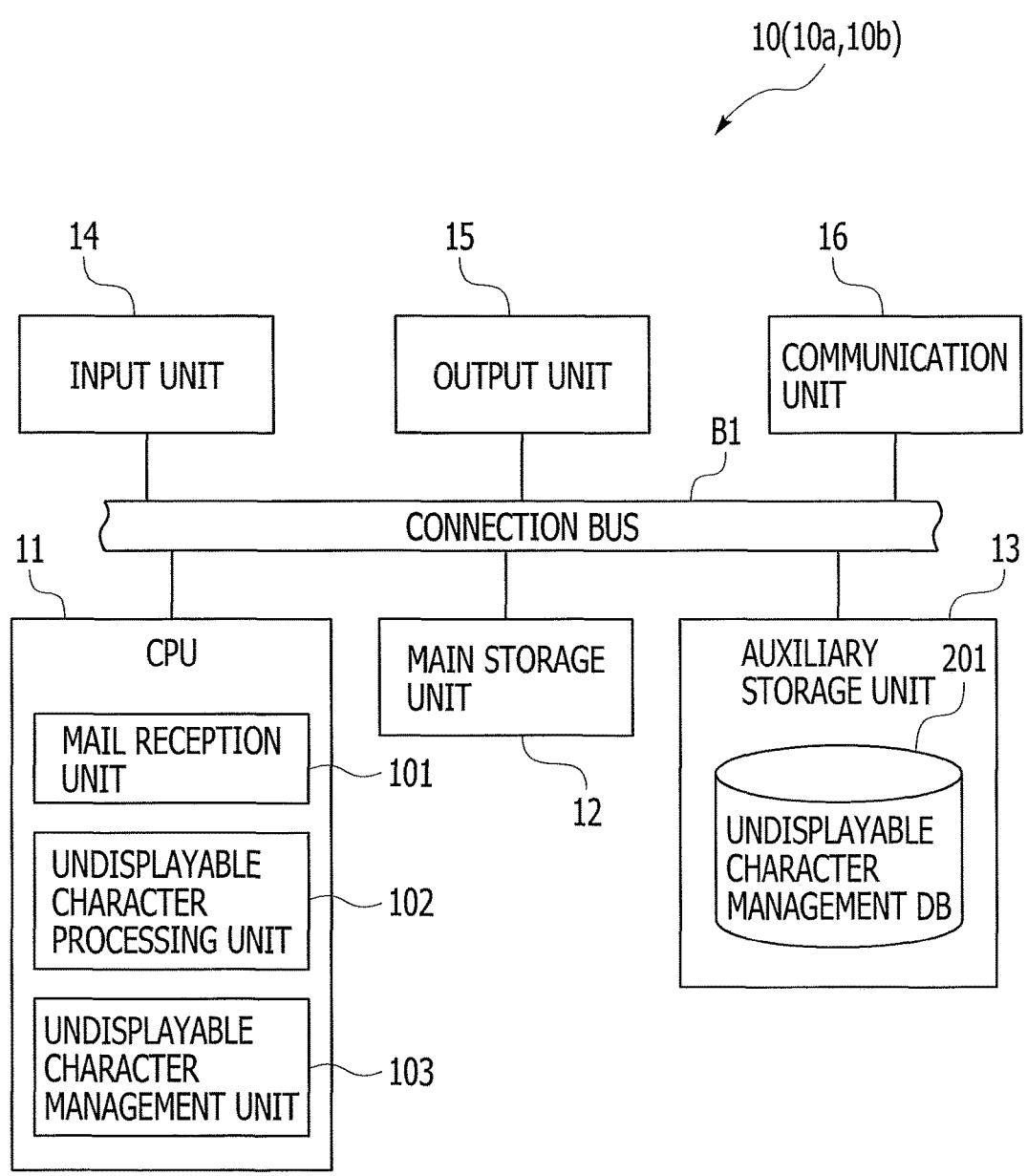
FIG. 2 is a diagram illustrating an example of a hardware configuration of a mail server according to an embodiment.

FIG. 2 illustrates one example of a hardware configuration of the mall server that runs the mail delivery program according to the embodiment. The mail server 10 illustrated in FIG. 2 includes a Central Processing Unit (CPU) 11, a main storage unit 12, an auxiliary storage unit 13, an input unit 14, an output unit 15 and a communication unit 16, which are interconnected via a connection bus B1. The main storage unit 12 and the auxiliary storage unit 13 are recording mediums that can be read by the mail server 10.

The CPU 11 deploys a program stored on the auxiliary storage unit 13 on a work area of the main storage unit 12, whereby the mail server 10 controls peripheral devices through running the program. The mail server 10 is thereby enabled to execute a process conforming to a predetermined purpose.

The CPU 11 is a central processing unit that controls the whole mail server 10. The CPU 11 executes the process in accordance with the program stored on the auxiliary storage unit 13. The main storage unit 12 is a storage medium on which the CPU 11 caches the program and the data, and deploys the work area. The main storage unit 12 includes, e.g., a flash memory, a Random Access Memory (RAM) and a Read Only Memory (ROM).

The auxiliary storage unit 13 stores various categories of programs and various items of data on the recording medium in a readable/writable manner. The auxiliary storage unit 13 is also called an external storage device. The auxiliary storage unit 13 stores, e.g., Operating System (OS), the various categories of programs, a variety of tables and other equivalent software components. The OS contains, e.g., a communication interface program for transferring and receiving the data to and from the external devices connected via the communication unit 16. The external devices include, e.g., the information processing apparatuses instanced by the PCs and the servers on the network N and the in-office networks, the information processing terminals 30, and the external storage devices.

The auxiliary storage unit 13 is instanced by an Erasable Programmable ROM (EPROM), a Solid State Drive (SSD), and a Hard Disk Drive (HDD). The auxiliary storage unit 13 can be instanced by a Compact Disc (CD) drive, a Digital Versatile Disc (DVD) drive, and a Blu-ray (registered trademark) Disc (BD) drive. The recording medium is instanced by a silicon disk including a nonvolatile semiconductor memory (flash memory), a hard disk, a Compact Disc (CD), a Digital Versatile Disc (DVD), a Blu-ray Disc (BD), a Universal Serial Bus (USB) memory, and a Secure Digital (SD) memory card.

The input unit 14 accepts an operational instruction and other equivalent indications from an administrator and other equivalent persons of the mail server 10. The input unit 14 is an input button like a power source button and an operation button, and an input device instanced by a pointing device and a microphone. The input unit 14 may also include the input device instanced by a keyboard and a wireless remote controller. The pointing device includes, e.g., a touch panel configured by combining a touch sensor with a display device like a Liquid Crystal Display (LCD) of the output unit 15, a mouse, a trackball and a joystick.

The output unit 15 outputs the data and the information that are processed by the CPU 11, and the data and the information that are stored on the main storage unit 12 and the auxiliary storage unit 13. The output unit 15 includes the display device instanced by the LCD, a Plasma Display Panel (PDP), an Electroluminescence (EL) panel and an organic EL panel. The output unit may also be an output device like a printer and a loudspeaker. The communication unit 16 is an interface with the network N and the in-office network that establish the connections with the mail servers 10.

The CPU 11 reads the OS, the various categories of programs and the various items of data, which are stored on the auxiliary storage unit 13, onto the main storage unit 12 and runs these software components, whereby the mail server 10 provides the respective processing units illustrated in FIG. 2 along with running the target programs. The various categories of programs contain the mail delivery program according to the embodiment.

The mail server 10 runs target programs, thereby providing processing units instanced by a mail reception unit 101, an undisplayable character processing unit 102, and an undisplayable character management unit 103. Note that the mail server 10 is configured so that the auxiliary storage unit 13 includes, e.g., a undisplayable character management DB 201 to which the respective processing units refer, or as a storage location of the data to be managed. Herein, the processing units provided by an event that the CPU 11 runs the target programs are one examples of "accepting" and "transmitting". The auxiliary storage unit 13 or the undisplayable character management DB 201 included by the auxiliary storage unit 13 is one example of "a storage unit".

Herein, the mail server 10 according to the embodiment may also be configured by, e.g., a plurality of information processing apparatuses. For example, the external storage device having the undisplayable character management DB 201 connects to the network N and the respective in-office networks. The information processing apparatus, which manages the mail addresses of the information processing terminals 30, is connected to each in-office network, thereby providing a process of the mail reception unit 101. Then, the information processing apparatus, which provides processes of the undisplayable character processing unit 102 and the undisplayable character management unit 103, is connected to each in-office network. The information processing apparatus and the external storage device on the network cooperate to run the mail delivery program according to the embodiment, thereby enabling a processing load to be distributed, which is caused by running the mail delivery program according to the embodiment.

[Configurations of Processing Units]

Figure 3:
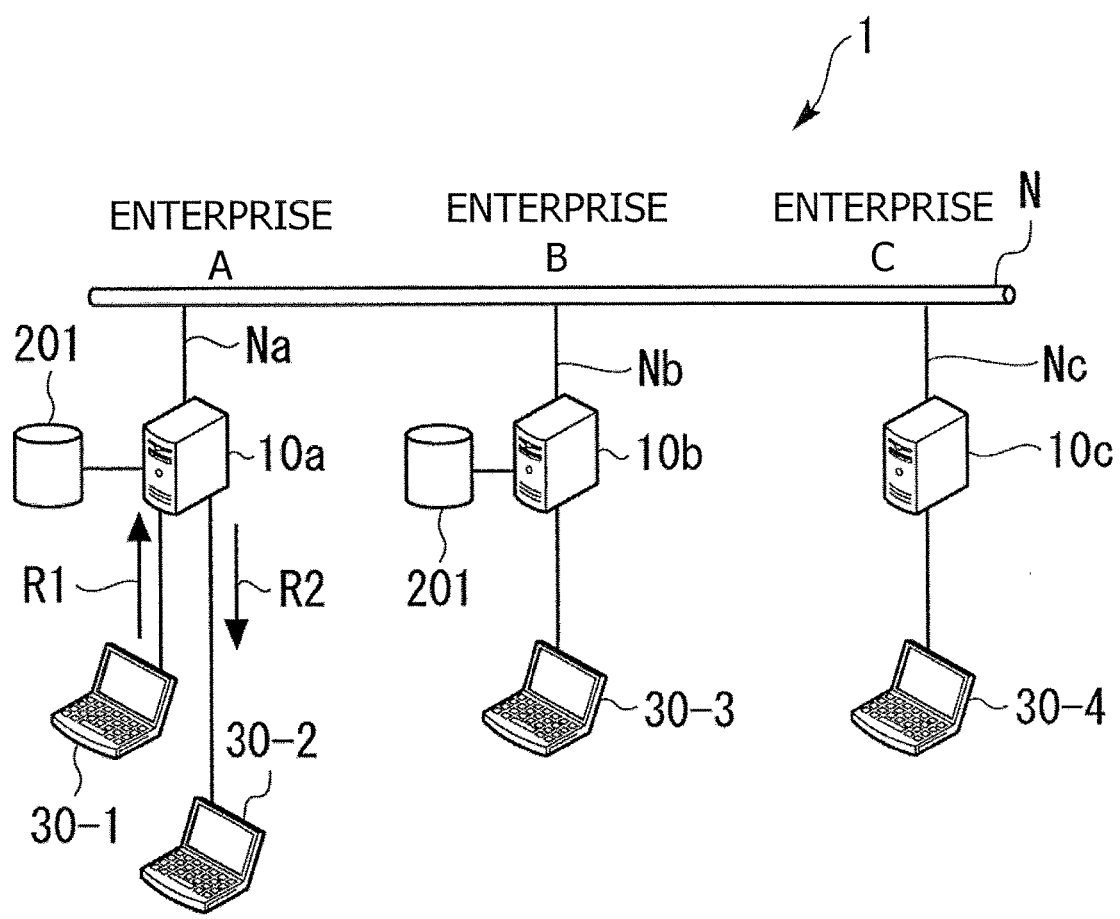
FIG. 3 is an explanatory diagram of a process pertaining to mail transmission of the mail server according to the embodiment.

Operations of the processing units of the mail server 10 according to the embodiment will be described with reference to the drawings of FIGS. 3-11. FIG. 3 illustrates one example of the mail delivery system 1 in such a mode that the mail servers 10a, 10b depicted in FIG. 1 run the mail delivery program according to the embodiment. The mail servers 10a, 10b, 10c, the in-office networks, the information processing terminals 30 and the network N, which are illustrated in FIG. 3, are the same as those in FIG. 1. However, in the mall servers 10a, 10b, the mail reception unit 101, the undisplayable character processing unit 102 and the undisplayable character management unit 103 are implemented by the mall delivery program according to the embodiment. In the mail servers 10a, 10b, the auxiliary storage units 13 include the undisplayable character management DBs 201.

In FIG. 3, such a case is assumed that the mail addressed to the information processing terminal 30-2 connected to the network Na is transmitted from the information processing terminal 30-1 connected to the same in-office network Na. As indicated by a route R1 in FIG. 3, the mail transmitted from the information processing terminal 30-1 is received via the communication unit 16 by the mail server 10a connected to the in-office network Na. The mail reception unit 101 of the mail server 10a accepts the transmission request of the mail to be transmitted by the information processing terminal 30-1 and received via the communication unit 16.

The mail reception unit 101 specifies, from the header of the mail with the transmission request being accepted, that the domain name of the destination information processing terminal 30-2 indicates the IP address of the self apparatus, and delivers the accepted mail to the self apparatus. The delivered mail is temporarily stored, e.g., in a predetermined area of the main storage unit 12 of the mail server 10a.

The mail reception unit 101 determines whether the accepted mail set as a target is a mail transmitted for the first time from the sender user or a replied/forwarded mail of the mail delivered to the sender user. Herein, the sender user is a user of the information processing terminal 30-1 that has transmitted the mail with the transmission request being accepted.

Note that the determination described above is made depending on whether, e.g., the accepted mail contains the information indicating that the mail has been delivered to the recipient (recipient user). The information indicating that the mail has been delivered to the recipient is, as already described, the predetermined character string. The mail reception unit 101 determines whether this information is contained in, e.g., the header or the body of the mail by analyzing the mail.

The mall reception unit 101, when the accepted mail contains the information described above, hands over the accepted mail to the undisplayable character processing unit 102. Whereas when the accepted mail does not contain the information described above, the mail reception unit 101 records the information in the accepted mail, and stores the information-recorded mail in the mailbox associated with the user name of the destination address.

As indicated by a route R2 in FIG. 3, the mail stored in the mailbox is transmitted to, e.g., the information processing terminal 30-2 allocated with the destination address. The mall recorded with the information indicating that the mail has been delivered to the recipient is delivered to the user of the information processing terminal 30-2.

When the information processing terminal 30-2 replies/forwards the mail delivered from the information processing terminal 30-1, the mail server 10*a* can determine based on the information described above that this mail is the replied/forwarded mall of the mail delivered to the information processing terminal 30-2.

The undisplayable character processing unit 102 conceals a description of the confidential item in the mail handed over from the mail reception unit 101. The confidential item is designated by the user who has described the information desired to be concealed in the mail and transmitted the mail. The undisplayable character processing unit 102 specifies the confidential item described in the mail in accordance with the designation, and conceals the specified confidential item.

FIG. 4 illustrates an example of a mail text, in which the confidential item is designated by using a marker. The marker connotes an indicator for designating the description of the confidential item in the mail. The user, who describes the information desired to be concealed in the mail and transmits the mail, designates a descriptive part of the information desired to be concealed by using the marker. FIG. 4 illustrates an example of using a marker indicating a start position of the description of the confidential item, and a marker indicating an end position thereof. The user, who transmits the mail, designates a descriptive range of the information desired to be concealed by the marker indicating the start position and the marker indicating the end position. Note that the marker indicating the start position of the description of the confidential item is also referred to as a [start marker], and the marker indicating the end position of the description of the confidential item is also referred to as an [end marker].

In the text example of FIG. 4, a character string "@@st@@" is used as the start marker, and a character string "@@ed@@" is used as the end marker. A character string "st" interposed between symbols "@@" and "@@" of the start marker indicates the start of the description, while a character string "ed" of the end marker indicates the end of the description.

In a rectangular area Z1 surrounded by a broken line, the descriptive range of the confidential item in the mail is delimited by the start marker and the end marker. In the rectangular area Z1, each of character strings "myid" and "xyzabc" is described between "@@st@@" and "@@ed@@". It is understood from the text example of FIG. 4 that pieces of information of the confidential items are the character string "myid" representing an account and the character string "xyzabc" representing a password.

The undisplayable character processing unit 102 executes searching for the start marker and the end marker by targeting at the body of the mail handed over from the mail reception unit 101. When the mail contains the information desired to be concealed as designated by the start marker and the end marker, the undisplayable character processing unit 102 detects the start marker and the end marker. The undisplayable character processing unit 102 specifies the character strings "myid" and "xyzabc", of which the descriptive range is delimited by the start marker and the end marker.

Note that the undisplayable character processing unit 102 executes searching for the start marker and the end marker, and, when not detecting these markers, stores the mail handed over from the mail reception unit 101 in the mailbox associated with the user name of the destination address. This is because the undisplayable character processing unit 102 can, when unable to detect the start marker and the end marker, determine that the handed mail does not contain the information desired to be concealed as intended by the user. The mail stored in the mailbox is transmitted to the information processing terminal 30-2 allocated with the destination address (route R2).

The undisplayable character processing unit 102 executes the concealment process targeted at the character strings "myid" and "xyzabc" specified from the mail. It may be sufficient that the concealment process is a process of converting the character/character string of the confidential item before being concealed into the undistinguishable state. The concealment process can be exemplified as one example by replacing the character/character string of the confidential item with the symbols such as the solid black circle and the solid black square, and also the pictograph. In the following discussion, the replacement of the character/character string of the confidential item with the undistinguishable symbols such as the solid black circle and the solid black square, and also the pictograph, is also referred to as "making characters undisplayable". The process of replacing the character/character string of the confidential item with the undistinguishable symbols such as the solid black circle and the solid black square, and the pictograph as well, is also referred to as "an undisplayable character process".

In the undisplayable character process, the undisplayable character processing unit 102 converts character codes of the characters contained in the specified character string, e.g., "myid" into character codes corresponding to the solid black circles. Similarly, the undisplayable character processing unit 102 converts the character codes of the characters contained in the specified character string, e.g., "xyzabc" into the character codes corresponding to the solid black circles. The undisplayable character processing unit 102 previously retains the character codes instanced by replaceable symbols (e.g., the solid black circles) for converting the character codes.

Figure 5:
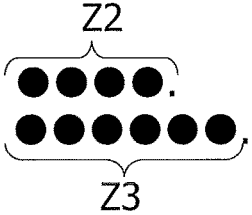
FIG. 5 is a diagram illustrating a text example after a undisplayable character process.

FIG. 5 depicts a text example after the undisplayable character process. The text example in FIG. 5 is one example of a case of converting the confidential items in FIG. 4 into the character codes using the solid black circles. The character string "myid", of which the descriptive range is delimited by the start marker and the end marker, is replaced with a symbol "●●●●", i.e., a 4-tuple of consecutive solid black circles as indicated in an area Z2 of FIG. 5. Further, as indicated by an area Z3 of FIG. 5, the descriptive range corresponding to the character string "xyzabc" is replaced with a symbol " ●●●●●● ", i.e., a 6-tuple of consecutive solid black circles.

The character string, of which the descriptive range of the confidential item is delimited by the start marker and the end marker, is blackened by the converted solid black circles, and hence it is understood that the descriptive content of the confidential item before being concealed is converted into the undistinguishable state. It is also comprehended that the start marker and the end marker for designating the confidential item are deleted from the text example before being concealed.

The undisplayable character processing unit 102 stores the mail, already undergone the undisplayable character process and being deleted the start marker and the end marker, in the mailbox associated with the user name of the destination address. The mail stored in the mailbox is transmitted to the information processing terminal 30-2 allocated with the destination address (route R2). The mail, already undergone the undisplayable character process and deleted the start marker and the end marker in the text example of FIG. 5, is delivered to the user of the information processing terminal 30-2 (route R2).

Note that the markers for designating the description of the confidential item may also be attained by, e.g., a modifying process such as coloring the characters, coloring the character string, changing a font size, underlining, and hatching. It may be sufficient that a usage mode of the markers for designating the description of the confidential item is previously settled between the mail server 10 and the information processing terminal 30. The pre-settled usage mode of the markers may simply be described in the computer program that is run by the mail server 10.

The mall server 10 includes the DB that previously registers the description (character/character string) of the confidential item in a mode such as "NG word", and may also specify the description of the confidential item by checking the description of the confidential item registered in the DB against the mail. The description (character/character string) of the confidential item may be registered per destination address and may also be registered per in-office network in common.

(Case of Delivery to Another Mail Server)

Figure 6:
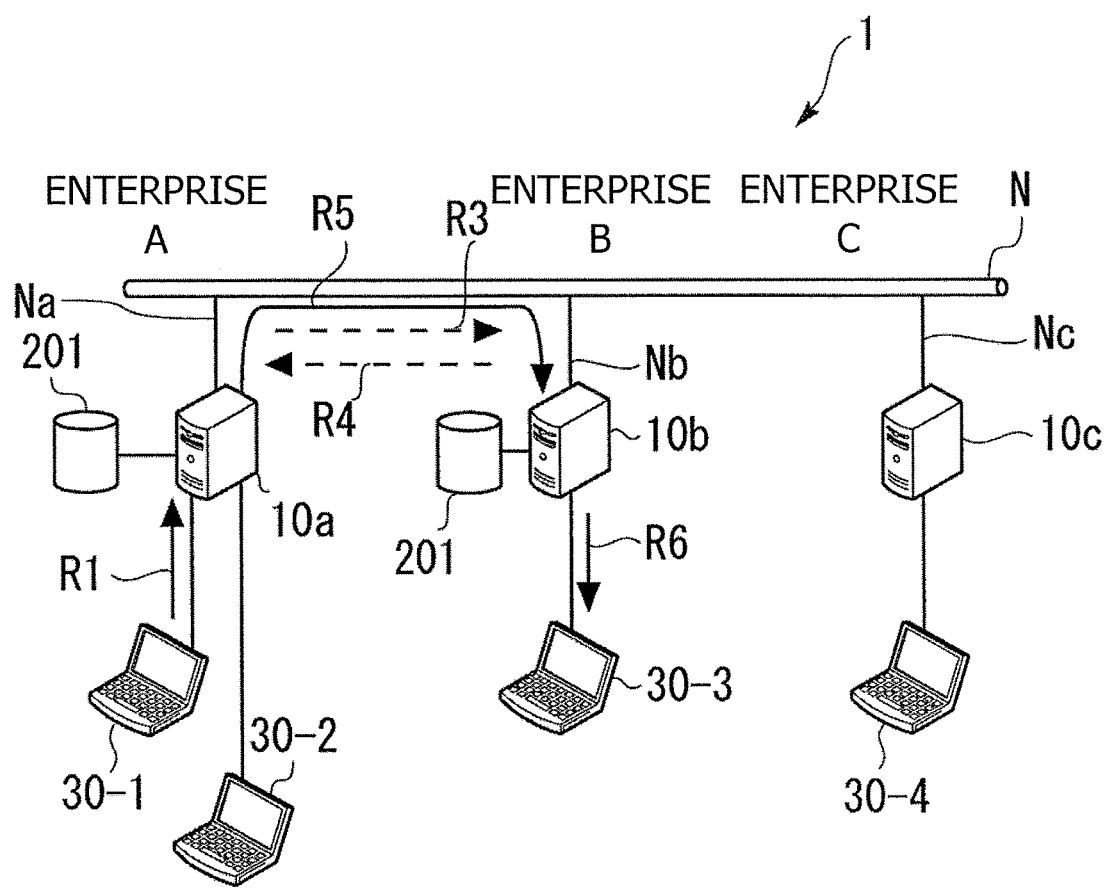
FIG. 6 is an explanatory diagram in the case of transmitting the mall to the mail server having a concealment function.

FIG. 6 illustrates an explanatory diagram of a case of transmitting the mail to the mail server having the concealment function. Note that the mail delivery system 1 in FIG. 6 is the same as the system in FIG. 3. The mail servers 10a, 10b run the mail delivery program according to the embodiment.

In FIG. 6, it is assumed that the mail addressed to the information processing terminal 30-3 is transmitted from the information processing terminal 30-1 connected to the in-office network Na. As indicated by the route R1 in FIG. 6, the mail transmitted from the information processing terminal 30-1 is received by the mail server 10a connected to the in-office network Na via the communication unit 16. The mail reception unit 101 of the mail server 10a accepts the transmission request, received via the communication unit 16, of the mail transmitted by the information processing terminal 30-1.

(Case of Delivery Destination Mail Server Having Concealment Function)

The mail reception unit 101 specifies the domain name of the destination information processing terminal 30-3 from the header of the mail with the transmission request being accepted. The mail reception unit 101 specifies, from the specified domain name, the mail server 10b defined as a relay destination of the mail with the transmission request being accepted. The mail reception unit 101 queries the specified mail server 10b about whether the server 10b has the concealment function (route R3). The query is given to the mail server 10b by using the communication protocol instanced by the TCP/IP.

The mail reception unit 101 specifies that the mail server 10b has the concealment function, from a response to the query about whether the server 10b has the concealment function (route R4). The mail reception unit 101 transmits the mail with the transmission request being accepted to the mail server 10b. The mail sent from the information processing terminal 30-1 is transmitted to the mail server 10b specified from the domain name of the mail address of the information processing terminal 30-3 (route R5).

The mail server 10b receives the mail transmitted from the mail server 10a. The mail server 10b executes the processes of the mail reception unit 101 and the undisplayable character processing unit 102, which are described by use of FIGS. 3-5, by targeting at the mail addressed to the information processing terminal 30-3. The mail server 10b records the information indicating that the mail has been delivered to the recipient (the information processing terminal 30-3) by targeting at the mail addressed to the information processing terminal 30-3. When the received mail contains this information, the character string of the confidential item described in the mail is concealed. Through the processes of the mail reception unit 101 and the undisplayable character processing unit 102, the mail undergoing the processes described above is delivered to the information processing terminal 30-3 (route R6).

(Case of Delivery Destination Mail Server not Having Concealment Function)

Figure 7:
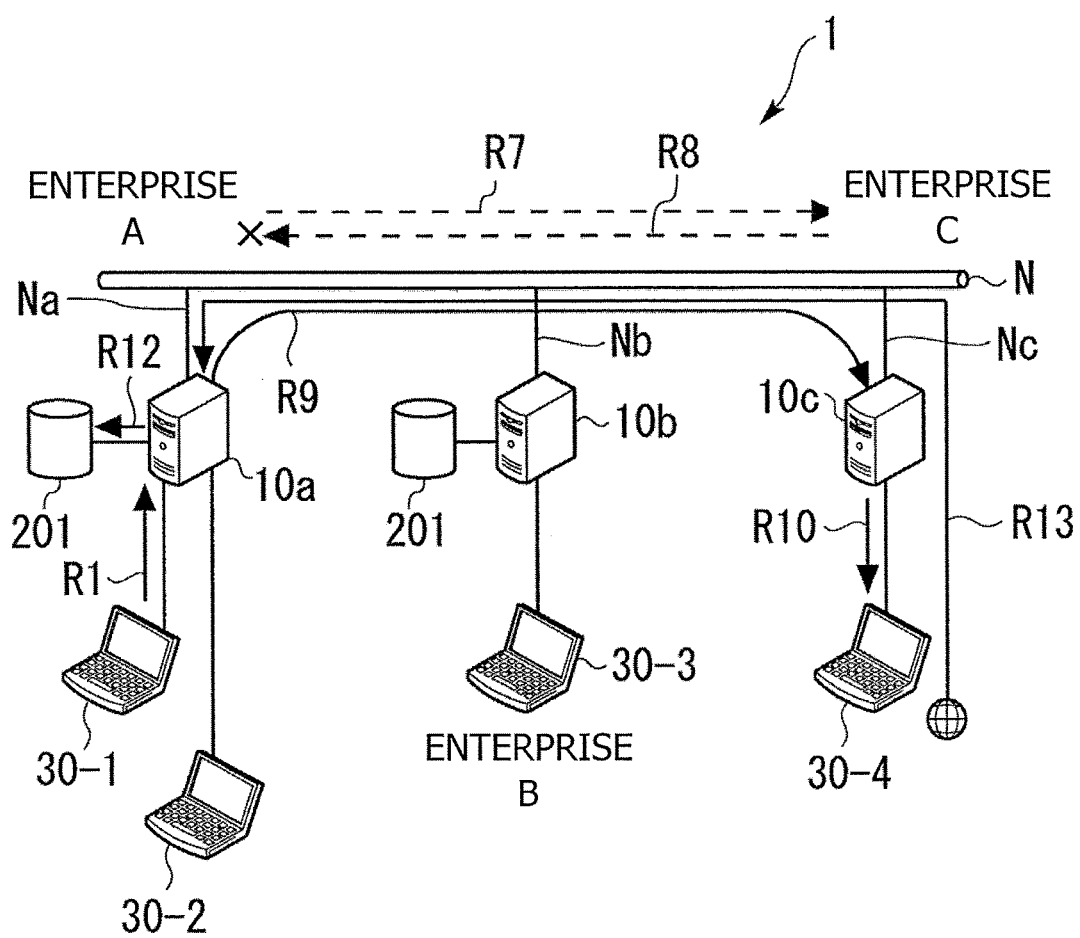
FIG. 7 is an explanatory diagram in the case of transmitting the mail to the mail server not having the concealment function.

FIG. 7 illustrates an explanatory diagram in the case of transmitting the mail to the mail server not having the concealment function. Note that the mail delivery system 1 in FIG. 7 is the same as the system in FIG. 6. The mail servers 10a, 10b run the mail delivery program according to the embodiment. In FIG. 7, it is assumed that the mail addressed to the information processing terminal 30-4 is transmitted from the information processing terminal 30-1 connected to the in-office network Na. As indicated by the route R1 in FIG. 7, the mail transmitted from the information processing terminal 30-1 is received by the mail server 10a connected to the in-office network Na via the communication unit 16. The mail reception unit 101 of the mail server 10a accepts the transmission request, received via the communication unit 16, of the mail transmitted by the information processing terminal 30-1.

The mail reception unit 101 specifies the domain name of the destination information processing terminal 30-4 from the header of the mail with the transmission request being accepted. The mail reception unit 101 specifies, from the specified domain name, the mail server 10c defined as the relay destination of the mail with the transmission request being accepted. The mail reception unit 101 queries the specified mail server 10c about whether the server 10c has the concealment function (route R7). The query is given to the mail server 10c by using the communication protocol instanced by the TCP/IP.

Any response to the foregoing query is not replied to the mail server 10c not having the concealment function, i.e., the mail server 10c not running the mail delivery program according to the embodiment. The mail reception unit 101 detects based on the time-out that the response to the query is not replied within a fixed period, thereby specifying that the mall server 10*c* does not have the concealment function (route R8).

The mail reception unit 101, when the mail server 10*c* defined as the relay destination of the mail with the transmission request being accepted does not have the concealment function, hands over the accepted mail to the undisplayable character processing unit 102. The undisplayable character processing unit 102, as described by using FIGS. 4 and 5, executes the concealment process for the mail handed over from the mail reception unit 101. However, when not having containing the markers for designating the information desired to be concealed within the handed mail, the concealment process is not carried out.

The undisplayable character processing unit 102 transmits the mail undergone the concealment process to the mail server 10*c* (route R9). The mail transmitted from the information processing terminal 30-1 and containing the description of the information desired to be concealed, is delivered to the information processing terminal 30-4 via the mail server 10*c* in such a undisplayable character state that the character string of the information desired to be concealed is converted into the character codes instanced by the solid black circles (route R10).

(Registration of Undisplayable Character Information in Database)

By the way, in the mail undergone the concealment process, the concealed information get in the undisplayable character state. The user of the information processing terminal 30-4, to which the mail kept in the undisplayable character state is delivered, is disabled from knowing the content (the descriptive content of the confidential item) that can be originally known.

For disclosing the descriptive content of the confidential item to the user qualifiable to originally know the content, the undisplayable character processing unit 102 executes a process of extracting the character string of the confidential item and storing the extracted character string in the undisplayable character management DB 201 on the occasion of the concealment process. The extracted character string of the confidential item is stored in the undisplayable character management DB 201 by being associated with a number, given per mail, for uniquely identifying the information described in the mail but desired to be concealed (route R12).

The undisplayable character processing unit 102 adds reference information containing the number associated with the character string of the confidential item to the mail undergoing the concealment process. Herein, the reference information is information for referring to the content of the information getting in the undisplayable character state via the browser application. The reference information can be exemplified by information structured by combining the IP address of the mail server including the undisplayable character management DB 201 with the number described above. The user, to whom the mail getting in the undisplayable character state is delivered, accesses the IP address contained in the reference information via the browser application, and is thereby enabled to refer to the content of the undisplayable characters using the number described above (route R13).

Figure 8:
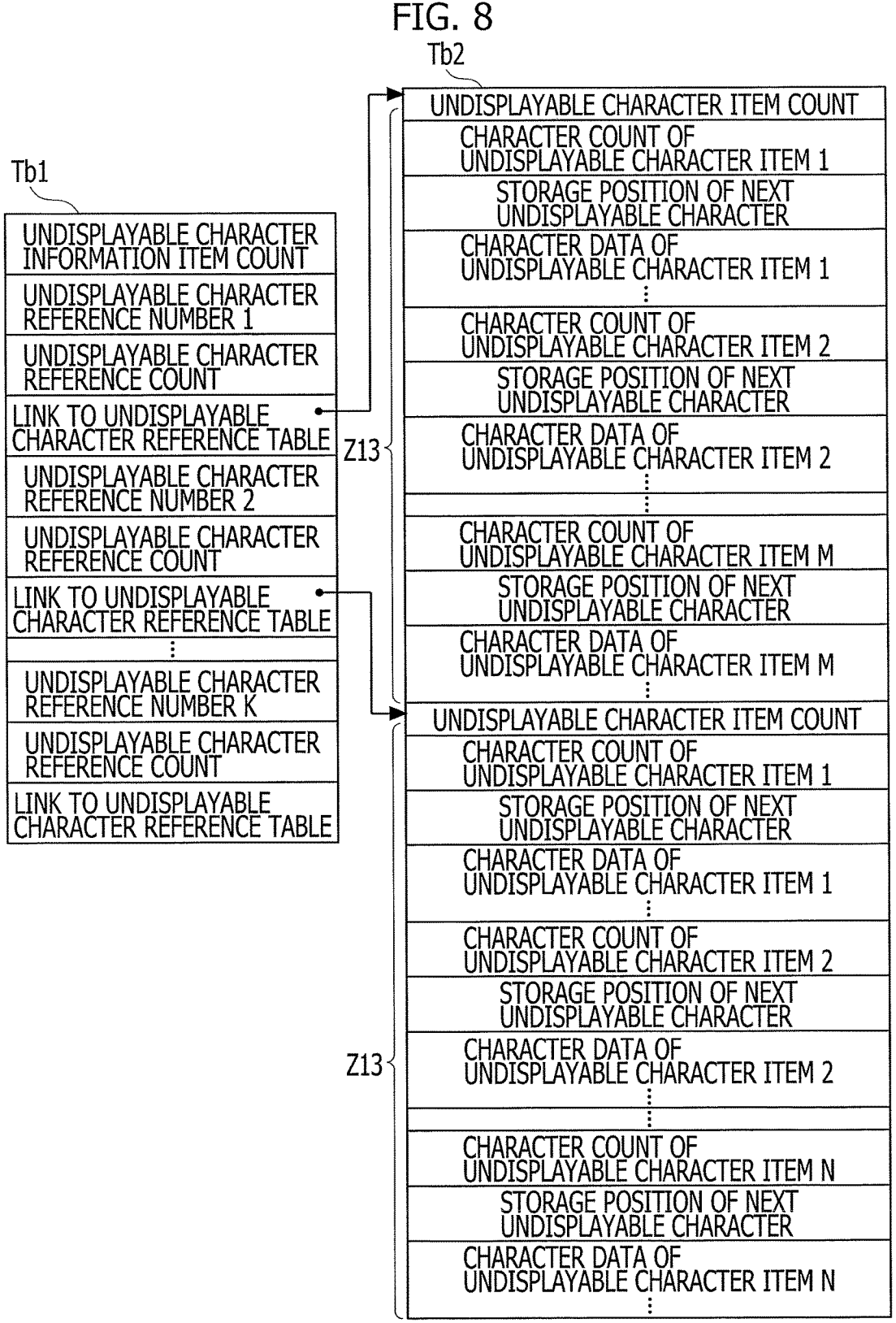
FIG. 8 is a diagram illustrating one example of an undisplayable character management DB.

FIG. 8 illustrates one example of the undisplayable character management DB 201. The undisplayable character management DB 201 depicted in FIG. 8 is a mode example of using a plurality of tables. A table Tb1 in FIG. 8 contains a plurality of records per mail undergone the concealment process. The table Tb1 contains the plurality of records such as the foregoing number used as the reference information, an address value (pointer) indicating a storage position of a table Tb2, and a reference count of how many times the content of the undisplayable characters is referred to. The table Tb2 stores sets of plural records of the information related to the descriptions of the confidential items in the mail.

In the table Tb1 of FIG. 8, the number, used as the reference information and given per mail, for uniquely identifying the information desired to be concealed that is described in the mail, is stored in a record "undisplayable character reference number k (an integer given by k=1–K)". A reference count of how many times the content of the undisplayable characters is referred to, is stored in a record "undisplayable character reference count". An address value indicating a head position in which to store a set of records of the table Tb2, i.e., a head storage position of the information related to the descriptions of the confidential items, is stored in a record "link to undisplayable character reference table".

The table Tb2 contains a storage area Z13 that stores the information related to the descriptions of the confidential items of the mail, corresponding to every mail undergoing the concealment process. An address value indicating the head position of the storage area Z13 is stored in the record "link to undisplayable character reference table" of the table Tb1.

In FIG. 8, the storage area Z13 of the table Tb2 contains an "undisplayable character item count" field, a "character count of undisplayable character item m (an integer given by m=1–M)" field, a "storage position of next undisplayable character" field, and a "character data of undisplayable character item m (an integer given by m=1–M" field. A descriptive part count of the confidential items is stored in the "undisplayable character item count" field. Note that a suffix "m" of "undisplayable character item" is allocated in the sequence of descriptions to the body. For example, when the descriptive part count of the confidential items in the mail is "2", this value "2" is stored in the "undisplayable character item count" field, and the suffix "m" (M=1, 2) is allocated to the descriptive parts in the sequence of descriptions to the body.

A character count of the confidential item before the concealment process is stored in the "character count of undisplayable character item m (the integer given by m=1–M)" field. An address value indicating the storage position of the information related to the next confidential item is stored in the "storage position of next undisplayable character" field. Note that when the next descriptive part does not exist, e.g., information such as "null" and "blank status" indicating no existence of the next descriptive part is stored therein. The character string of the confidential item before the concealment process is stored as character data in the "character data of undisplayable character item m (the integer given by m=1–M" field.

Figure 9:
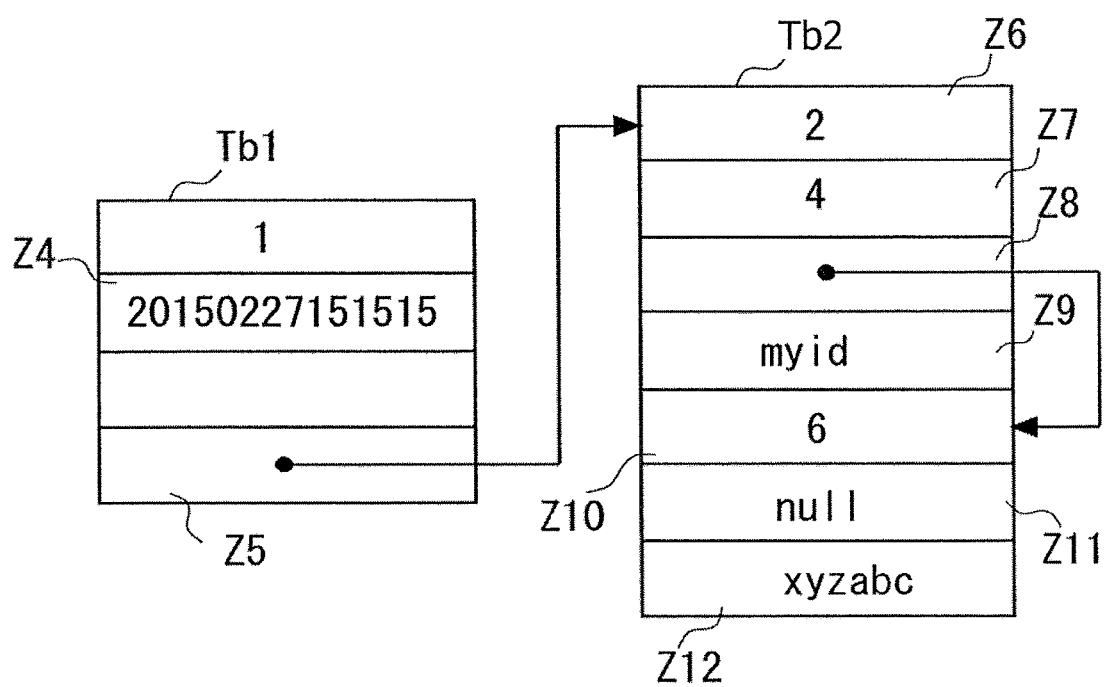
FIG. 9 is a diagram illustrating a storage example of the undisplayable character management DB with respect to the text example in FIG. 4.

FIG. 9 illustrates the undisplayable character management DB 201 with respect to the text example in FIG. 4. In FIG. 9, an area Z4 of the table Tb1 indicates the record "undisplayable character reference number" and stores a per-mail number "20150227151515" for uniquely identifying the information described in the mail but desired to be concealed. The number "20150227151515" in the area Z4 is a number allocated per mail with respect to the text example of FIG. 4. An address value indicating the head storage position of the table Tb2, which stores the information related to the description of the confidential item, is stored in an area Z5 of the table Tb1.

In the text example of FIG. 4, the descriptive part count of the confidential items each designated by the start marker and the end marker is "2", and hence, as indicated by an area Z6, this value "2" is stored in the "undisplayable character item count" field of the table Tb2. The character counts and the character data are stored in the table Tb2 in the sequence of the descriptive parts of the confidential items. In the text example of FIG. 4, the character counts and the character data are stored in the sequence of the character strings "myid" and "xyzabc".

As indicated by an area Z7 of the table Tb2, a character count "4" of the character string "myid" is stored in the "character count of undisplayable character item 1" field. As indicated further by an area Z8, an address value indicating the storage position of the information related to the character string "xyzabc" is stored in the "storage position of next undisplayable character" field. As indicated still further by an area Z9, the character string "myid" as the description of the confidential item designated by the start marker and the end marker, is stored in the "character data of undisplayable character item 1" field.

As indicated by an area Z10 of the table Tb2, a character count "6" of the character string "xyzabc" is stored in the "character count of undisplayable character item 2" field. In the text example of FIG. 4, none of the descriptive part next to the character string "xyzabc" exists. Therefore, As indicated by an area Z11, "null" is stored as information indicating non-existence of the next descriptive part. Then, as indicated by the area Z9, the character string "xyzabc" as the description of the confidential item designated by the start marker and the end marker, is stored in the "character data of undisplayable character item 2" field.

The undisplayable character processing unit 102, after storing the character strings extracted from the mail in the undisplayable character management DB 201, converts the character strings of the confidential items into the undisplayable character state. The undisplayable character processing unit 102 adds, to the mail undergoing the undisplayable character process, the reference information containing the per-mail number "20150227151515 for uniquely identifying the information desired to be concealed before the conversion of the undisplayable characters. The undisplayable character processing unit 102 transmits the mail receiving the addition of the reference information and undergoing the undisplayable character process to the mail server 10c. The mail undergoing the undisplayable character process is delivered together with the reference information to the user of the information processing terminal 30-4.

FIG. 10 illustrates a text example, after the undisplayable character process, to which the reference information is added. FIG. 10 illustrates the example of a case of adding the reference information to a tail of the text of the mail. In FIG. 10, the reference information is represented by "[HuseID: 010221018011-20150227151515]" in an area Z14 framed by a broken line.

In the example of FIG. 10, "[HuseID:]" is an indicator for indicating the reference information, and "010221018011" given in an area Z15 is an IP address of the mail server 10a including the undisplayable character management DB 201. The number "20150227151515" given in an area Z16 is a per-mail number for uniquely identifying the information desired to be concealed before the conversion into the undisplayable characters. It is understood that the reference information given in the area Z14 is structured by combining the IP address with the per-mail number for uniquely identifying the information desired to be concealed before the conversion into the undisplayable characters by using a symbol "-".

The user of the information processing terminal 30-4 receiving the mail containing the text example illustrated in FIG. 10 specifies, from, e.g., the reference information added to the tail of the text, the IP address "010221018011" of the mail server 10a including the undisplayable character management DB 201. It is also specified in the reference information that the number "20150227151515" joined to the IP address through the symbol "-" is the number for uniquely identifying the information desired to be concealed before the conversion into the undisplayable characters. The user of the information processing terminal 30-4 accesses the mail server 10a specified by the IP address "010221018011" via, e.g., the browser application, thus referring to the content of the undisplayable characters using the number described above.

(Reference Process to Content of Undisplayable Characters)

Figure 11:
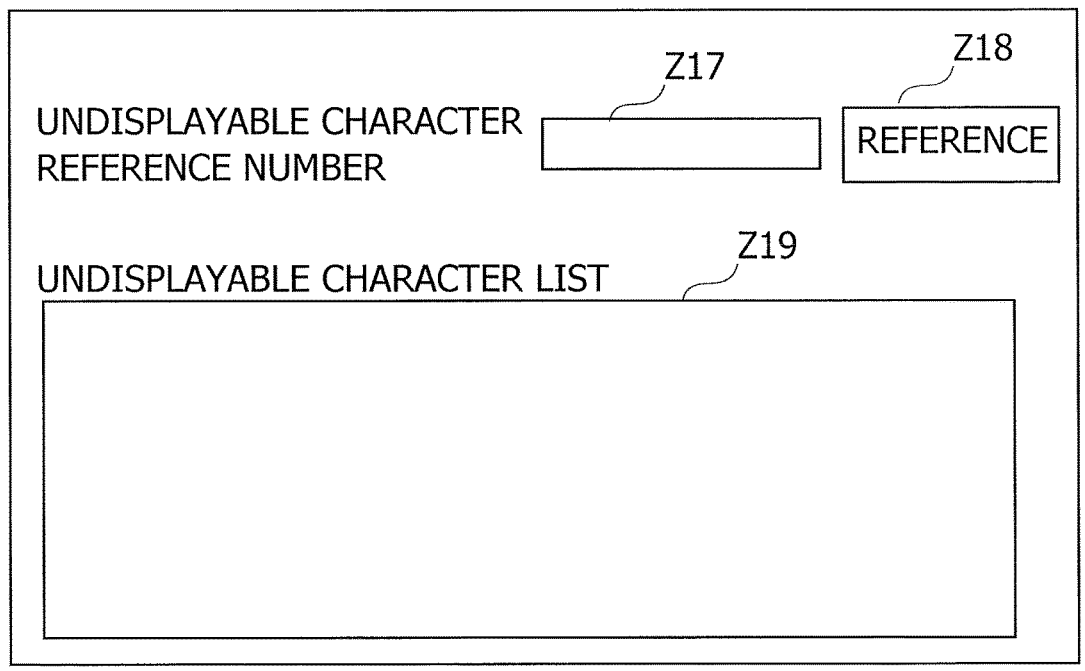
FIG. 11 is a diagram illustrating an example of a reference screen displayed on an information processing terminal.

The undisplayable character management unit 103 of the mall server 10a displays a reference screen for referring to the information undergoing the undisplayable character process on the display device of the information processing terminal 30-4, corresponding to the access from the information processing terminal 30-4 via the browser application. FIG. 11 illustrates one example of the reference screen. In the example of the reference screen depicted in FIG. 11, an area Z17 is an input area of the number (which will hereinafter be also termed an undisplayable character reference number) for uniquely identifying the information desired to be concealed before the conversion into the undisplayable characters. In the example of the reference screen, the area Z18 is an operation component for implementing the reference to the undisplayable character reference number inputted to the area Z17. An area Z19 is an area in which to display a result of the reference to the inputted undisplayable character reference number.

The information processing terminal 30-4 accepts, e.g., an operation input of the undisplayable character reference number "20150227151515" to the area Z17 on the reference screen illustrated in FIG. 11, and further accepts an operation input such as a click on the operation component of the area Z18. The mail server 10a is notified of the undisplayable character reference number "20150227151515" inputted to the area Z17 on the reference screen via the network N.

The undisplayable character management unit 103 accepts the undisplayable character reference number "20150227151515" inputted via the reference screen. The undisplayable character management unit 103 executes searching the undisplayable character management DB 201 by using the accepted undisplayable character reference number "20150227151515" as a search key. The undisplayable character management unit 103 specifies a record associated by the undisplayable character reference number "20150227151515" in the table Tb1 of the undisplayable character management DB 201. The undisplayable character management unit 103 acquires the address value indicating the head storage position of the table Tb2 stored, e.g., in the area Z5 in FIG. 9.

The undisplayable character management unit 103 specifies the storage area Z13 stored in the table Tb2 from the acquired address value. Then, the undisplayable character management unit 103 acquires the character strings "myid" and "xyzabc" before the undisplayable character process. The undisplayable character management unit 103 displays the acquired character strings "myid" and "xyzabc" before the undisplayable character process in the area Z19 on the reference screen. The user of the information processing terminal 30-4 browses, e.g., the character strings "myid" and "xyzabc" before the undisplayable character process, which are displayed in the area Z19 on the reference screen, and is thereby enabled to know the content of the undisplayable characters converted by using the symbols instanced by the solid black circles.

Note that the disclosure of the content of the undisplayable characters stored in the undisplayable character management DB 201 is limited in terms of the reference count, in which case the undisplayable character management unit 103 limits the disclosure of the content of the undisplayable characters, based on the reference count stored in the record "undisplayable character reference count" of the table Tb1. The undisplayable character management unit 103, for example, when the reference count exceeds a predetermined limit count, displays a message saying that "Browsing of the content of the undisplayable characters is not permitted" in the area Z19 on the reference screen.

[Processing Flow]

Figure 12:
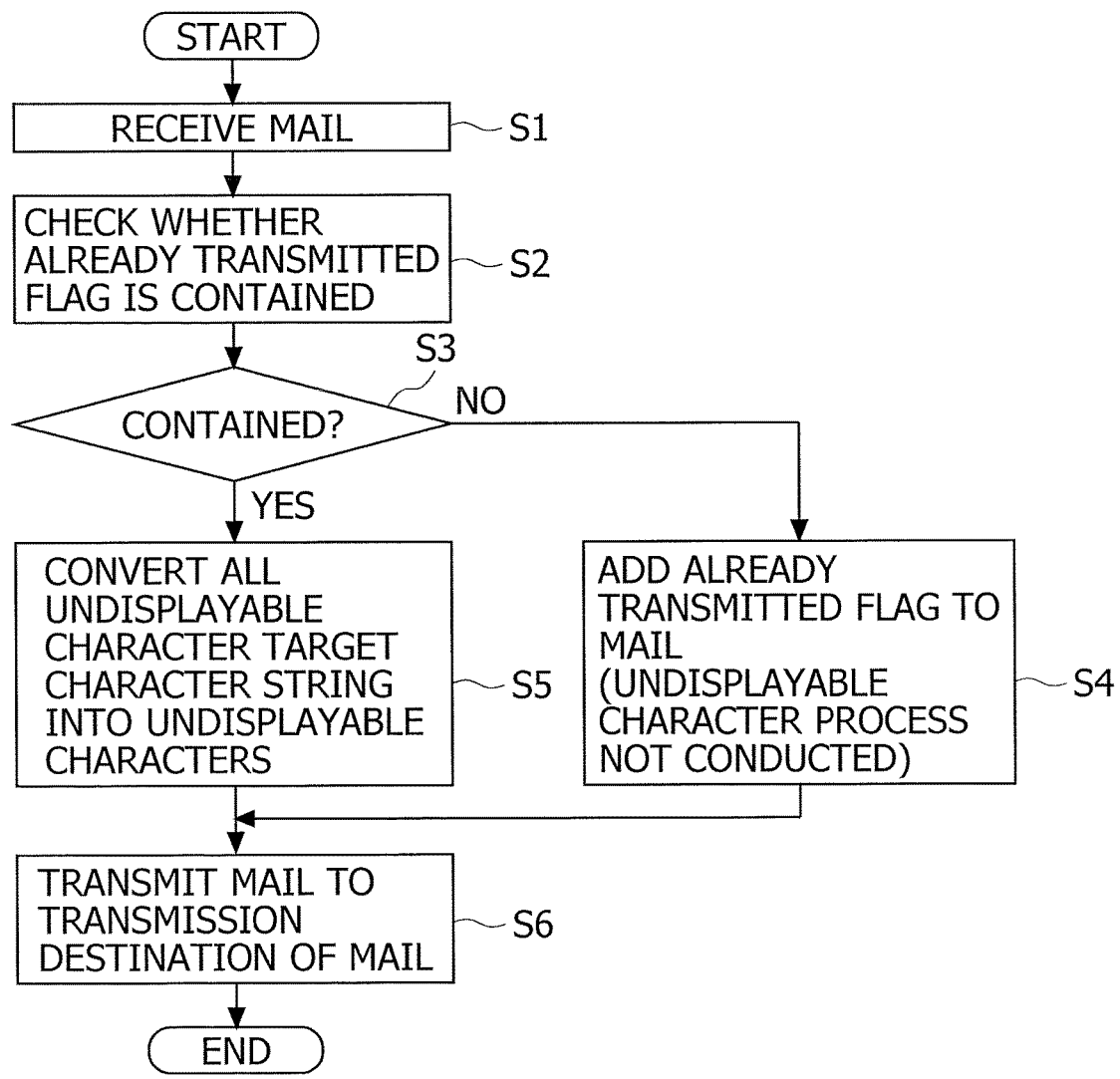
FIG. 12 is a flowchart illustrating processes when a domain name of a destination address indicates a self apparatus.
Figure 13:
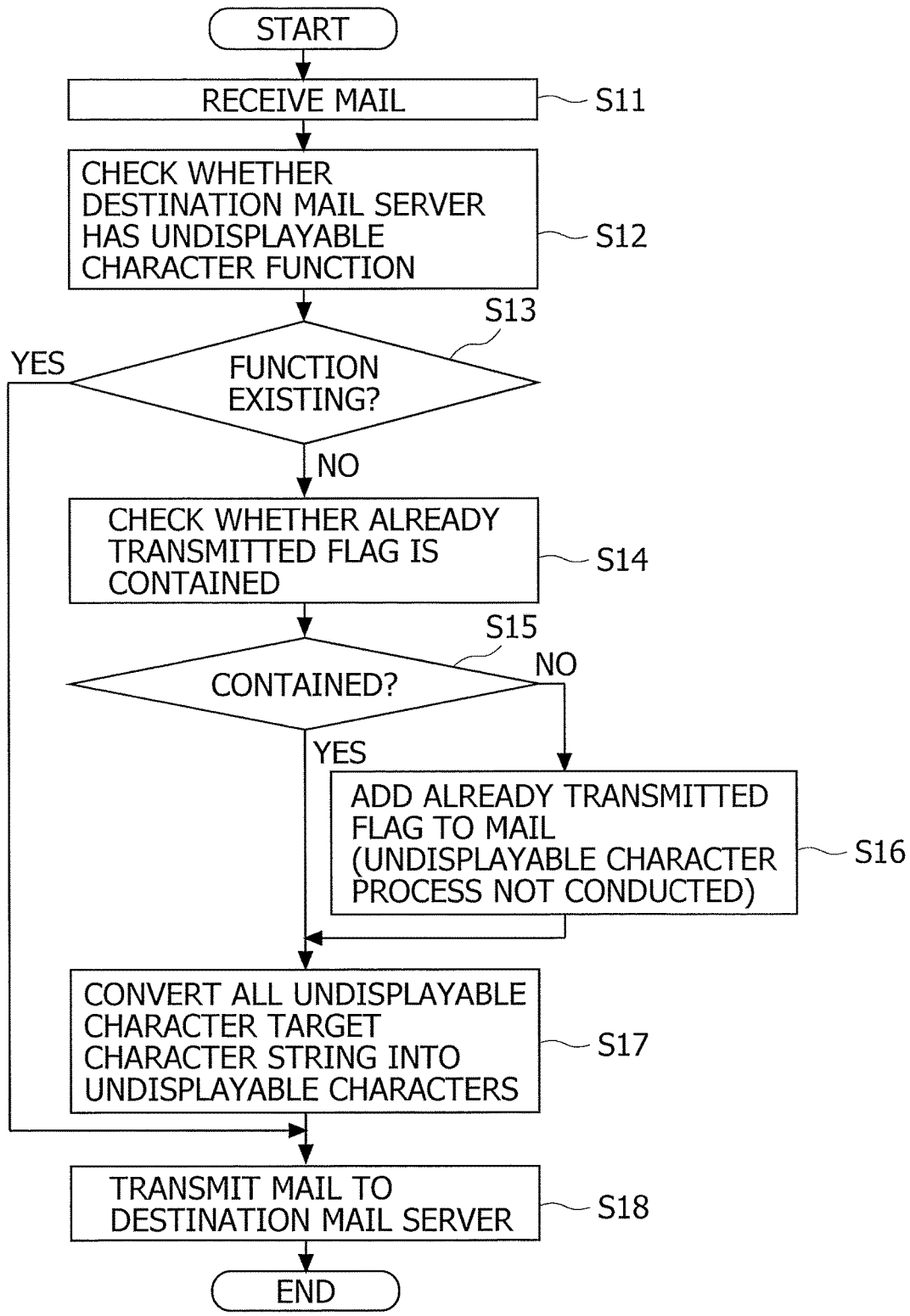
FIG. 13 is a flowchart illustrating processes when the domain name of the destination address indicates another mail server.
Figure 14:
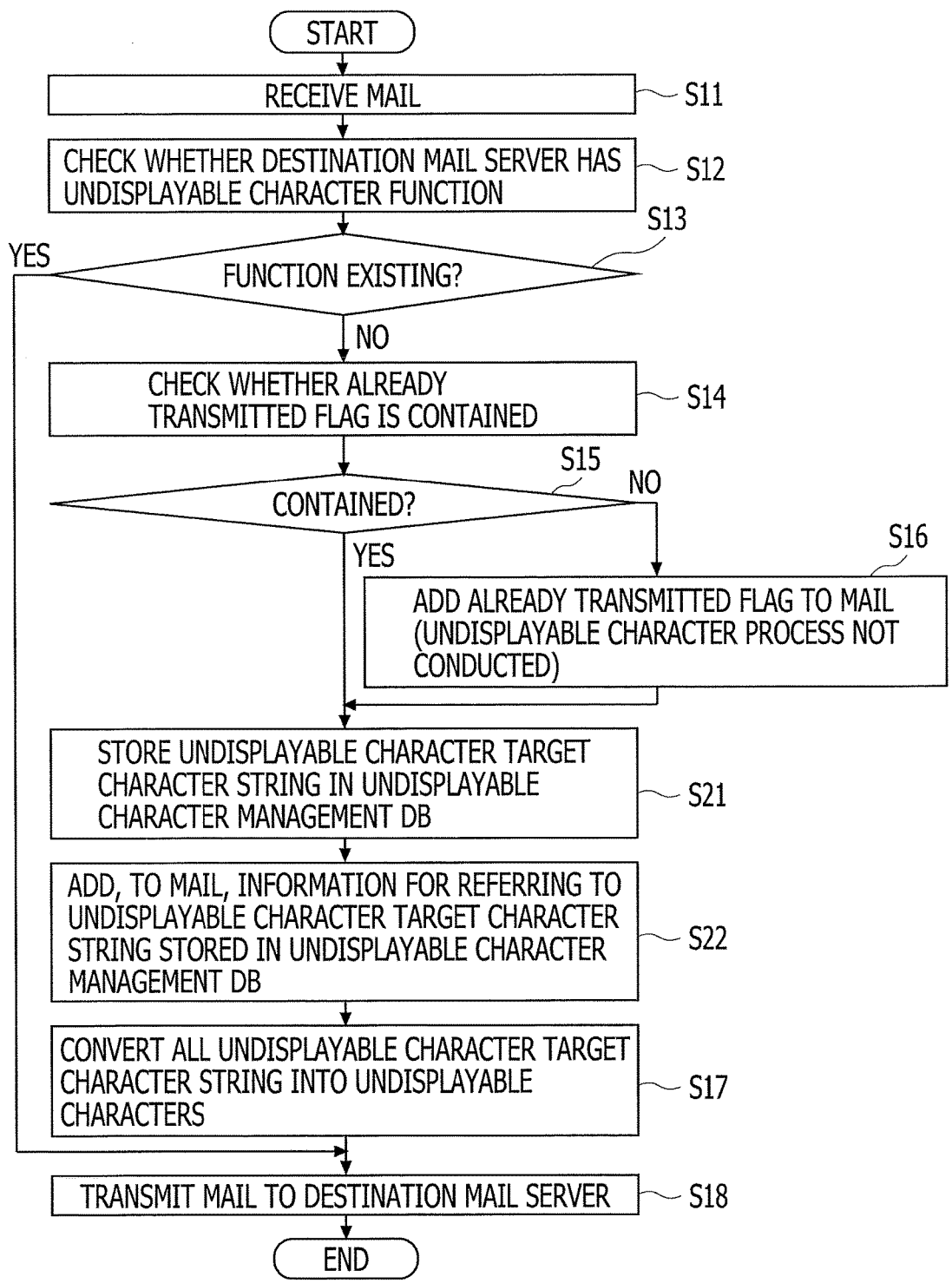
FIG. 14 is a flowchart illustrating processes of storing a description of a confidential item in the undisplayable character management DB when the domain name of the destination address indicates another mail server.
Figure 15A:
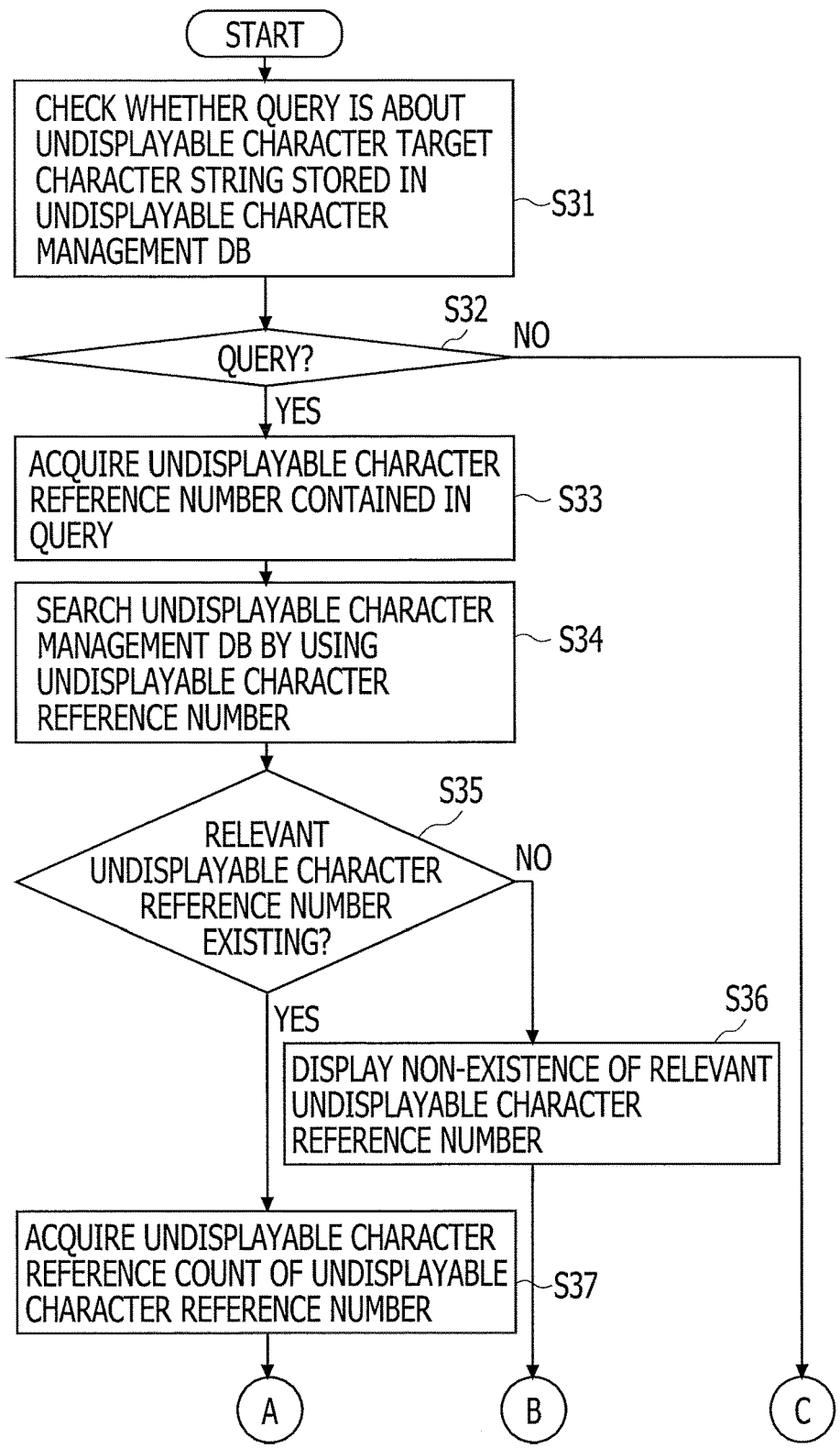
FIGS. 15A-15B are flowcharts illustrating processes of referring to a content of the undisplayable characters.
Figure 15B:
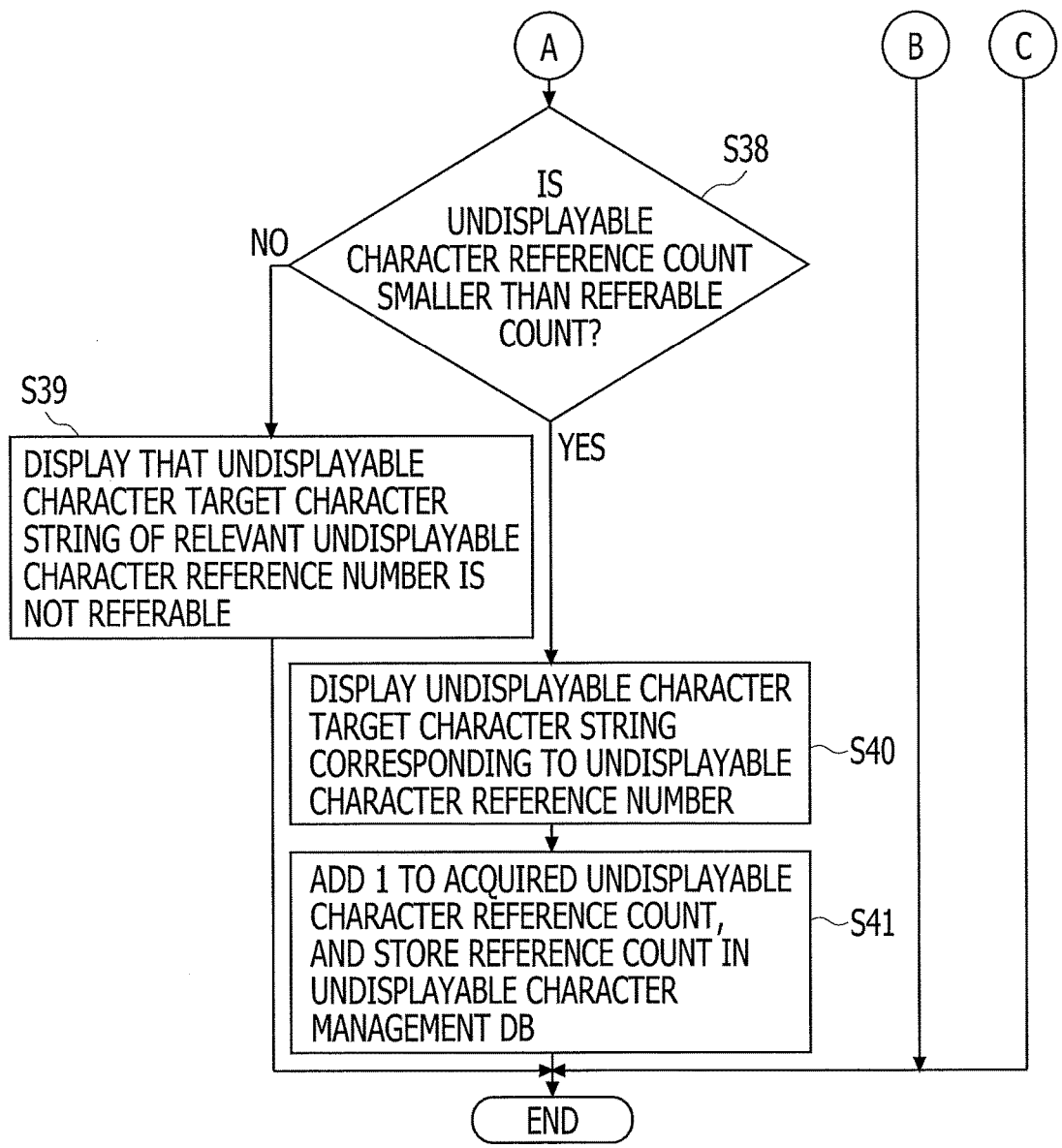

Processes of the mail server 10 running the mail delivery program according to the embodiment will hereinafter be described with reference to flowcharts illustrated in FIGS. 12-15. FIG. 12 is the flowchart illustrating one example of a process of such a case that the domain name of the destination address of the mail with the transmission request being accepted indicates the self apparatus. FIG. 13 is the flowchart illustrating one example of a process such a case that the domain name of the destination address of the mail with the transmission request being accepted indicates another mail server. FIG. 14 is the flowchart illustrating one example of a process of registering the description of the confidential item in the undisplayable character management DB 201 in such a case that the domain name of the destination address of the mail with the transmission request being accepted indicates another mail server. FIGS. 15A-15B are the flowcharts illustrating one example of a process of referring to the content of the undisplayable characters.

In the mail server 10, the CPU 11 reads the OS, the various categories of programs including the mail delivery program according to the embodiment and the various items of data, which are stored on the auxiliary storage unit 13, onto the main storage unit 12 and runs these software components, thereby executing the processes illustrated in FIGS. 12-15. The mail server 10 executes the processes illustrated in FIGS. 12-15 with reference to the undisplayable character management DB 201 or by using the undisplayable character management DB 201 as the storage location of the data to be managed.

Note that the information (e.g., the predetermined character string) recorded in the mail server 10 according to the embodiment and indicating that the mail has been delivered to the recipient, will also be termed an "already transmitted flag" in the following discussion. The character string becoming a target of the undisplayable character process will also be termed an "undisplayable character target character string". The undisplayable character target character string in the mail is, as described by using FIG. 3, designated by the user transmitting the mail with the markers. The undisplayable character target character string is the information described in the mail but desired to be concealed. A concealment function of converting the undisplayable character target character string into the undisplayable characters is also termed a "undisplayable character function".

In the flowchart illustrated in FIG. 12, a start of the processes of the mail server 10 can be exemplified as triggered by, e.g., accepting the transmission request of the mail. The mail server 10 accepts the transmission request of the mail, of which the domain name of the destination address indicates the self apparatus (S1). The mail server 10 acquires the accepted mail, and temporarily stores the acquired mail in a predetermined area of the main storage unit 12. The acceptance of the transmission request of the mail has been described by use of FIGS. 1, 3 and other equivalent drawings.

The mail server 10 checks whether the mail acquired in the process of S1 contains the already transmitted flag (S2). The mail contains the already transmitted flag, i.e., the information indicating that the mail has been delivered to the recipient, and it can be therefore specified whether this mail is the replied/forwarded mail of the mail temporarily delivered to the user specified by the source address. The mail server 10 analyzes the acquired mail and thus determines whether the already transmitted flag is contained in the header or the body thereof.

The mail server 10, when the already transmitted flag is contained (S3, Yes), moves to a process in S5. Whereas when the already transmitted flag is not contained (S3, No), the mail server 10 diverts to a process in S4.

In the process of S4, the mail server 10 adds the already transmitted flag to the mail acquired in the process of S1. The mail server 10 records the already transmitted flag to the header or the body of the mail. In the process of S4, the mail server 10 does not, however, execute the undisplayable character process even when the mail contains the undisplayable target character string as the information desired to be concealed. The mail server 10 hands the mail with the already transmitted flag being added over to a process in S6.

In the process of S5, the mail server 10 makes undisplayable the undisplayable target character string in the mail. With respect to the undisplayable target character string as the confidential item in the mail, its descriptive parts and the descriptive range within the mail are designated and delimited by, e.g., the start marker and the end marker. The start marker and the end marker have been already described by use of FIG. 4.

For example, the mail server 10 executes searching the body of the mail for the start marker and the end marker. The mail server 10 specifies the undisplayable target character string by detecting the start marker and the end marker. The mail server 10 converts the character codes of the specified undisplayable target character string into the undistinguishable symbols such as the solid black circle and the solid black square, and also the pictograph, respectively. The undisplayable character process of converting the character codes of the undisplayable target character string into the undistinguishable symbols has already been described by using FIG. 5. All the undisplayable target character string is converted into the undisplayable characters by the process in S5.

The mail server 10 hands over the mail, of which the undisplayable target character string is all converted into the undisplayable characters, to a process in S6. Note that the mail server 10, when the start marker and the end marker are not detected in the process of S5, can determine that the processing target mail does not contain the information desired to be concealed. In this case, the mail server 10 hands over the mail not containing the information desired to be concealed to the process of S6.

In the process of S6, the mail server 10 transmits the mail handed over from the processes of S4, S5 to the mail destination. The mail server 10 stores, e.g., the mail handed over from the processes of S4, S5 in the mailbox associated with the user name of the destination address. The mail stored in the mailbox is delivered to the information processing terminal 30 allocated with the destination address.

Through the processes described above, the mail server 10, when the mail with the transmission request being accepted is the replied/forwarded mail of the mail delivered to the user specified by the source address, can conceal the confidential item (confidential information) described in the mail. The mail server according to the embodiment enables the content of the mail to be concealed when the mail is replied/forwarded to another destination address from the receiving destination.

(Case of Delivery to Another Mail Server)

In the flowchart illustrated in FIG. 13, similarly to FIG. 12, a start of the processes of the mail server 10 can be exemplified as triggered by accepting the transmission request of the mail. The mail server 10 receives the mail with the transmission request being accepted (S11). The mail server specifies, from the header of the received mail, the domain name of the destination information processing terminal 30. The mail server 10 specifies, from the domain name, the mail server (which will hereinafter be also termed a transmission destination mail server) specified by the IP address associated with the domain name.

The mail server 10 checks whether the transmission destination mail server has the undisplayable character function (S12). A determination about whether the transmission destination mail server has the undisplayable character function can be made from, e.g., a response to a query given to the transmission destination mail server about whether this server has the undisplayable character function.

When the transmission destination mail server has the undisplayable character function, a predetermined response to the query is replied within a fixed period. Whereas when the transmission destination mail server does not have the undisplayable character function, it does not happen that the response to the query is replied. The mail server 10 detects from the time-out and other equivalent events that the response to the query is not replied within the predetermined period, and thus specifies that the transmission destination mail server does not have the concealment function. Note that the query to the transmission destination mail server is made by use of the communication protocol instanced by the TCP/IP.

The mail server 10, when the transmission destination mail server has the undisplayable character function (S13, Yes), diverts to a process in S18. In the process of S18, the mail server 10 transmits the mail received in the process of S11 to the mall server having the IP address specified from the domain name of the destination address. The transmission destination mail server having the undisplayable character function receives the mail transmitted in the process of S18, and executes the processes described by using FIG. 12 by targeting at this received mail.

While on the other hand, when the transmission destination mail server has none of the undisplayable character function (S13, No), the mail server 10 moves to the process in S14. In the process of S14, the mail server 10 checks whether the mail contains the already transmitted flag by targeting at the mail received in the process of S11. The transmission destination mail server not having the undisplayable character function is disabled from converting the undisplayable target character string of the mail containing the already transmitted flag into the undisplayable characters. Therefore, the mail server 10 according to the embodiment, when the mail received in the process of S11 contains the already transmitted flag, converts the undisplayable target character string into the undisplayable characters, and thereafter transmits the mail to the destination mail server.

Note that the mail server 10, when the transmission destination mail server does not have the undisplayable character function, may notify the alert (alarm) to the information processing terminal 30 specified by the source address from which to transmit the transmission request of the mail, and may thereafter finish the processes in FIG. 13. When the transmission destination mail server has none of the undisplayable character function, the mail is not transmitted, and hence it does not happen that the mail containing the description of the information desired to be concealed is delivered to the information processing terminal 30 specified by the destination address. It is feasible to prevent the leakage of the confidential content due to the replied/forwarded mail from the user to whom the mail is delivered.

The mail server 10 analyzes the received mail, and thus determines whether the already transmitted flag is contained in the header or the body. The mail server 10, when the already transmitted flag is contained (S15, Yes), moves to a process in S17. Whereas when the already transmitted flag is not contained (S15, No), the mail server 10 diverts to a process in S16.

In the process of S16, the mail server 10 adds the already transmitted flag to the mail. The mail server 10 records the already transmitted flag in the header or the body of the mail. In the process of S16, however, the mail server 10 does not execute the undisplayable character process even when the main contains the undisplayable character target character string as the information desired to be concealed. The mail server 10 hands the mail with the already transmitted flag being added over to a process of S17.

In the process of S17, the mail server 10 makes undisplayable the undisplayable character target character string in the mail. The process of S17 includes executing same process as the process in S5 Illustrated in FIG. 12. The mail server 10 hands over, to a process of S18, the mail, of which the undisplayable character target character string in the mail is all converted into the undisplayable characters. Note that when the mail contains none of the undisplayable character target character string in the process of S17, the mail containing the already transmitted flag is handed over to a process of S18.

In the process of S18, the mail server 10 transmits the mail handed over from the process of S17 to the transmission destination mail server having the IP address specified by the domain name of the destination address. The transmission destination mail server not having the undisplayable character function receives the mail transmitted in the process of S18, and stores the received mail in the mailbox associated with the user name of the destination address. The mail, of which the undisplayable character target character string is all converted into the undisplayable characters, is delivered to the information processing terminal 30 allocated with the destination address.

The processes described above enable the mail server 10 to transmit with the transmission request being accepted depending on whether the transmission destination mail server has the concealment function. The mail server 10, after concealing the description of the confidential item in the mail, can transmit this mail to the transmission destination mail server not having the concealment function. The mail server according to the embodiment can, even when the transmission destination mail server does not have the concealment function, prevent the leakage of the information of the confidential content due to the replied/forwarded mail of the user of the destination address to which the mail is delivered.

(Storage of Undisplayable Character Information into Database)

When the transmission destination mail server does not have the undisplayable character function, the mail server 10 can store the undisplayable character target character string in the undisplayable character management DB 201, add the reference information for referring to the undisplayable character target character string to the mail, and thus transmit the mail. The mail server 10 can disclose the undisplayable character target character string registered in the undisplayable character management DB 201, corresponding to the reference based on the reference information given from the recipient of the mail to which the reference information is added. The recipient of the mail, to which the reference information is added, can know the descriptive content of the confidential item with the characters being made undisplayable, which is to be originally known to the recipient.

In a flowchart illustrated in FIG. 14, processes in S11-S18 are the same as the processes illustrated in FIG. 13. The mail server 10 further executes processes in S21 and S22 as processes of registering the undisplayable character target character string in the undisplayable character management DB 201, and adding the reference information for referring to the undisplayable character target character string to the mail. The processes in S21 and S22 will hereinafter be described.

In the process of S21 illustrated in FIG. 14, the mail server 10 stores the undisplayable character target character string described in the mail handed over from S15, S16 in the undisplayable character management DB 201. For example, the mail server 10 executes searching for the start marker and the end marker of the mail by targeting at the mail handed over from S15, S16. The mail server 10 detects the start marker and the end marker, thereby specifying the undisplayable character target character string. The mail server 10 extracts the specified undisplayable character target character string, and stores the extracted undisplayable character target character string in the undisplayable character management DB 201. The undisplayable character management DB 201 has already described by using FIG. 8 and other equivalent drawings.

The mail server 10 extracts the undisplayable character target character strings designated by the start markers and the end markers in the sequence of the descriptive parts. The extracted undisplayable character target character strings are temporarily stored in the predetermined area of the main storage unit 12 in the sequence of the descriptive parts. The mail server 10 generate the data, which are to be registered in the storage area Z13 of the table Tb2 of the undisplayable character management DB 201, based on the extracted undisplayable character target character strings.

The mail server 10 stores, e.g., a descriptive part count of the extracted undisplayable character target character strings in the "undisplayable character item count" field of the storage area Z13 of the table Tb2. Next, the mail server 10 stores the character count of the undisplayable character target character string in the "character count of undisplayable character item 1" field, in which the undisplayable character target character string that is the earliest of the sequence of the descriptive parts is defined as the "undisplayable character item 1". The mail server 10 further stores the undisplayable character target character string, which is the earliest of the sequence of the descriptive parts, in the "character data of undisplayable character item 1" field.

The mail server 10, when the plurality of undisplayable character target character strings exists, defines the undisplayable character target character string, which is the second earliest of the sequence of the descriptive part, as an "undisplayable character item 2". The mail server 10 stores, in the "storage position of next undisplayable character" field, a storage position in which to store the character count of the undisplayable character target character string defined as the "undisplayable character item 2". The mail server 10 stores the character count of the undisplayable character target character string defined as the "undisplayable character item 2" in a storage position continuous to the "character data of undisplayable character item 1" field. Note that when the undisplayable character target character string is singular in number, e.g., "null" is stored in the "storage position of next undisplayable character" field. The mail server 10 generates the data to be registered in the storage area Z13 of the table Tb2 of the undisplayable character management DB 201 by iterating the processes described above with respect to the extracted undisplayable character target character strings.

The mail server 10 allocates, e.g., a uniquely identifying number to the generated content of the storage area Z13, i.e., to the information desired to be concealed in the mail. The uniquely identifying number is allocated per mail. The mail server 10 generates the table Tb1 by associating the uniquely identifying number with the count of how many times the content, generated in the table Tb2, of the storage area Z13 is referred to, and the head position of the generated storage area Z13.

The mail server 10 stores the uniquely identifying number of the information desired to be concealed within the mail in the record "undisplayable character reference number k (the integer given by k=1-K)". The mail server 10 further stores an initial value (e.g., "0") in the record "undisplayable character reference count". Likewise, the mail server 10 stores the address value indicating the head storage position of the storage area Z13 in the record "link to undisplayable character reference table".

The tables Tb1 and Tb2 are generated, thereby completing the storage of the undisplayable character target character strings of the target mail into the undisplayable character management DB 201. The mall server 10, after completing the storage of the undisplayable character target character strings into the undisplayable character management DB 201, hands over the number (undisplayable character reference number) stored in the record "undisplayable character reference number k (the integer given by k=1-K)" of the table Tb1 to a process in S22.

In the process of S22, the mail server 10 adds, to the mail, the reference information for referring to the undisplayable character target character string stored in the undisplayable character management DB 201. The mail server 10 generates the reference information by associating, e.g., the undisplayable character reference number handed over to the process in S21 with the IP address of the self apparatus. The mail server 10 generates the reference information by, e.g., associating the IP address of the self apparatus with undisplayable character reference number. The mail server 10 adds the generated reference information to the tail of the mail text.

Note that the mail server 10, as illustrated in FIG. 10, may also use an indicator for indicating that a description of associating the IP address with the undisplayable character reference number is the reference information for referring to the undisplayable character target character string before the conversion into the undisplayable characters. The use of the indicator makes it possible to clarify that the description, added to the mail, of associating the IP address with the undisplayable character reference number is the reference information. The mail server 10 hands the mail to which the reference information is added over to the process of S17.

(Reference Process to Content of Undisplayable Characters)

Next, a reference process to the content of the undisplayable characters will be described with reference to a flowchart depicted in FIGS. 15A-15B. FIGS. 15A-15B illustrate an example of the flowchart in the case of disclosing the content of the undisplayable characters stored in the undisplayable character management DB 201 on the basis of the undisplayable character reference number inputted via the reference screen illustrated in FIG. 11.

In the flowchart of FIGS. 15A-15B, a start of the processes of the mail server 10 can be exemplified as triggered by accepting the access from the information processing terminal 30 via the browser application. The mail server 10 checks whether the access from the information processing terminal 30 is a query about the undisplayable character target character string stored in the undisplayable character management DB 201 (S31).

The mall server 10 displays, e.g., the reference screen for presenting the content of the information undergoing the undisplayable character process on the display device of the information processing terminal 30, corresponding to the access from the information processing terminal 30. The reference screen depicted in FIG. 11 is displayed on the display device of the information processing terminal 30. For example, the mail server 10 determines, from the notification of the undisplayable character reference number inputted via the reference screen, that the query is the query about the undisplayable character target character string stored in the undisplayable character management DB 201.

The mail server 10, when the query is the query about the undisplayable character target character string stored in the undisplayable character management DB 201 (S32, Yes), moves to a process in S33. Whereas when the query is not the query about the undisplayable character target character string stored in the undisplayable character management DB 201 (S32, No), the mail server 10 finishes the processes in FIGS. 15A-15B.

In the process of S33, the mail server 10 acquires the undisplayable character reference number contained in the query. The mail server 10 searches the undisplayable character management DB 201 by using the acquired undisplayable character reference number (S34). The mail server 10 searches for the record in the table Tb1 of the undisplayable character management DB 201 by using, e.g., the undisplayable character reference number inputted via the reference screen as the search key.

The mail server 10, when the relevant undisplayable character reference number exists in the table Tb1 of the undisplayable character management DB 201 (S35, "existing"), moves to a process in S37. Whereas when the relevant undisplayable character reference number does not exist in the table Tb1 of the undisplayable character management DB 201 (S35, "not existing"), the mail server 10 diverts to a process in S36.

In the process of S36, the mail server 10 displays the non-existence of the relevant undisplayable character reference number in the area Z19 on the reference screen. The mail server 10 displays, e.g., a predetermined message saying that "the undisplayable character reference number to be referred to does not exist" in the area Z19 on the reference screen. The mail server 10, after the process in S36, finishes the processes in FIGS. 15A-15B.

In the process of S37, the mail server 10 acquires the undisplayable character reference count of the undisplayable character reference number. For example, the mail server 10 acquires, as the undisplayable character reference count, a storage value in the record "undisplayable character reference count" associated with the undisplayable character reference number. The mail server 10 determines whether the acquired undisplayable character reference count is smaller than a referable count. Herein, the referable count is a threshold value for restricting the disclosure of the content of the undisplayable characters stored in the undisplayable character management DB 201. The referable count is preset per mail server including, e.g., the undisplayable character management DB 201. For example, an initial value of the undisplayable character reference count is "0", and the threshold value "1" is set as the referable count, in which case a disclosure count of the content of the undisplayable characters is limited to "1".

The mail server 10, when the undisplayable character reference count is not smaller than the referable count (S38, No), diverts to a process in S39. Whereas when the undisplayable character reference count is smaller than the referable count (S38, Yes), the mail server 10 moves to a process in S40.

In the process of S39, the mail server 10 displays that the undisplayable character target character string having the relevant undisplayable character reference number is not referable in the area Z19 on the reference screen. The mail server 10 displays, e.g., a predetermined message saying that "the browsing of the content of the undisplayable characters of the undisplayable character reference number referred to is not permitted" in the area Z19 on the reference screen. The mail server 10, after the process in S39, finishes the processes in FIGS. 15A-15B.

In the process of S40, the mail server 10 acquires the undisplayable character target character string associated with the undisplayable character reference number, and displays the acquired undisplayable character target character string in the area Z19 on the reference screen. The mail server 10 acquires, e.g., a storage value (address value) in the record "link to undisplayable character reference table" associated with the undisplayable character reference number. The mail server 10 specifies, from the acquired storage value, the head storage position of the storage area Z13 associated with the undisplayable character reference number in the table Tb2, and acquires the stored undisplayable character target character strings in the sequence of the descriptive parts (the sequence of the undisplayable character items). The mail server 10 displays, e.g., the acquired undisplayable character target character strings in the area Z19 on the reference screen in the sequence of the descriptive parts.

In the process of S41, the mail server 10 adds "1" to the undisplayable character reference count acquired in the process of S37, and stores this undisplayable character reference count in the undisplayable character management DB 201. For example, the undisplayable character reference number acquired in the process of S37 is "0", in which case the undisplayable character reference count becomes "1" after the process in S41. The mail server 10 stores "1" in the record "undisplayable character reference count" in the table Tb1 of the undisplayable character management DB 201. The mail server 10, after the process in S41, finishes the processes in FIGS. 15A-15B.

The processes described above enable the mail server 10 to disclose the content of the confidential item stored in the undisplayable character management DB 201, corresponding to the reference based on the reference information from the recipient user of the mail. The mall server 10 is further enabled to restrain unnecessary items of information to be disclosed by limiting the reference count of the content of the confidential item.

According to a computer that runs the mail delivery program, it is feasible to conceal the content of the mail when the mail is forward to another transmission address from the transmission destination.

<Non-Transitory Computer Readable Recording Medium>

A program making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and run the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a Compact Disc Read Only Memory (CD-ROM), a Compact Disc-Recordable (CD-R), a Compact Disc-ReWriterable (CD-RW), a DVD, a BD, a Digital Audio Tape (DAT), an 8 mm tape, and a memory card like a flash memory. A hard disc, a ROM and other equivalent recording mediums are given as the non-transitory recording mediums fixed within the computer and other equivalent apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a mail delivery program of a mail server including a processor, the mail delivery program causing the processor to perform:
   determining whether a mail accepted by the mail server with a transmission request contains:
      information indicating that the mail includes a content that has been already transmitted, and
      information indicating concealment of the content of the mail at a forwarding of the mail, wherein the information indicating concealment indicates that the content includes a confidential description;
   concealing, upon determining that the mail contains both the information indicating the mail is already transmitted and the information indicating concealment, the confidential description by replacing the confidential description with another description;
   transmitting the mail after the concealing of the confidential description;
   querying a relay server, which relays the accepted mail, about whether the relay server includes a concealment function that performs the concealing of the confidential description;
   determining, based on a response to the query, whether the relay server includes the concealment function; and
   transmitting, upon determining that the relay server includes the concealment function, the accepted mail to the relay server.

2. The non-transitory computer-readable recording medium according to claim 1, wherein the mail delivery program further causes the processor to perform:
   recording, when the mail accepted with the transmission request does not contain the information indicating the mail is already transmitted, the information indicating the mail is already transmitted in the mail; and
   transmitting the mail after the recording.

3. The non-transitory computer-readable recording medium according to claim 1, wherein the mail delivery program further causes the processor to perform:
   executing, upon determining that the relay server does not include the concealment function, the concealing of the confidential description; and
   transmitting, after the concealing of the confidential description, the mail to the relay server.

4. The non-transitory computer-readable recording medium according to claim 3, wherein the mail delivery program further causes the processor to perform:
   adding a management number that uniquely designates the concealed confidential description;
   transmitting, after the adding of the management number, the mail to the relay server;
   storing the management number and the confidential description in a storage in association with each other; and
   disclosing, in response to a query containing the management number from a recipient receiving the mail via the relay server, the stored confidential description with the management number so that the confidential description is restorable.

5. The non-transitory computer-readable recording medium according to claim 1, wherein the mail delivery program further causes the processor to perform:
   notifying an alert to a transmission requester of the mail accepted with a transmission request; and
   stopping, upon determining that the relay server does not have the concealment function, the transmitting of the mail accepted with a transmission request.

6. A mail server comprising:
   a memory; and
   a processor coupled to the memory and that:
      accepts, by the mail server, a mail with a transmission request of the mail; and
      determines whether the mail contains:
         information indicating that the mail includes a content that has been already transmitted, and
         information indicating concealment of the content of the mail at a forwarding of the mail, wherein the information indicating concealment indicates that the content includes a confidential description;

conceals, upon determining that the mail contains both the information indicating the mail is already transmitted and the information indicating concealment, the confidential description by replacing the confidential description with another description;

transmits the mail after the concealing of the confidential description;

queries a relay server, which relays the accepted mail, about whether the relay server includes a concealment function that performs the concealing of the confidential description;

determines, based on a response to the query, whether the relay server includes the concealment function; and transmits, upon determining that the relay server includes the concealment function, the accepted mail to the relay server.

7. The mail server according to claim 6, wherein the processor further:

records, when the mail accepted with the transmission request does not contain the information indicating the mail is already transmitted, the information indicating the mail is already transmitted in the mail; and transmits the mail after the recording.

8. The mail server according to claim 6, wherein the processor further:

executes, upon determining that the relay server does not include the concealment function, the concealing of the confidential description; and transmits, after the concealing of the confidential description, the mail to the relay server.

9. The mail server according to claim 8, wherein the processor further:

adds a management number that uniquely designates the concealed confidential description;

transmits, after the adding of the management number, the mail to the relay server;

stores the management number and the confidential description in a storage in association with each other; and discloses, in response to a query containing the management number from a recipient receiving the mail via the relay server, the stored confidential description with the management number so that the confidential description is restorable.

10. The mail server according to claim 6, wherein the processor further:

notifies an alert to a transmission requester of the mail accepted with a transmission request; and stops, upon determining that the relay server does not have the concealment function, the transmitting of the mail accepted with a transmission request.

11. A mail delivery method executed by a mail server, the mail delivery method comprising:

determining whether a mail accepted by the mail server with a transmission request contains:

information indicating that the mail includes a content that has been already transmitted, and information indicating concealment of the content of the mail at a forwarding of the mail, wherein the information indicating concealment indicates that the content includes a confidential description;

concealing, upon determining that the mail contains both the information indicating the mail is already transmitted and the information indicating concealment, the confidential description by replacing the confidential description with another description;

transmitting the mail after the concealing of the confidential description;

querying a relay server, which relays the accepted mail, about whether the relay server includes a concealment function that performs the concealing of the confidential description;

determining, based on a response to the query, whether the relay server includes the concealment function; and transmitting, upon determining that the relay server includes the concealment function, the accepted mail to the relay server.

12. The mail delivery method according to claim 11, further comprising:

recording, when the mail accepted with the transmission request does not contain the information indicating the mail is already transmitted, the information indicating the mail is already transmitted in the mail; and transmitting the mail after the recording.

13. The mail delivery method according to claim 11, further comprising:

executing, upon determining that the relay server does not include the concealment function, the concealing of the confidential description; and transmitting, after the concealing of the confidential description, the mail to the relay server.

14. The mail delivery method according to claim 13, further comprising:

adding a management number that uniquely designates the concealed confidential description;

transmitting, after the adding of the management number, the mail to the relay server;

storing the management number and the confidential description in a storage in association with each other; and disclosing, in response to a query containing the management number from a recipient receiving the mail via the relay server, the stored confidential description with the management number so that the confidential description is restorable.

* * * * *